(12) United States Patent
Brault et al.

(10) Patent No.: US 11,684,019 B2
(45) Date of Patent: *Jun. 27, 2023

(54) VERTICAL FARMING LAYER STRUCTURE AND METHOD FOR VERTICAL FARMING USING THE SAME

(71) Applicant: INNO-3B INC., St-Pacôme (CA)

(72) Inventors: Martin Brault, Saint-Pacôme (CA); Éric Dubé, St-Bruno de Kamouraska (CA); Samuel Faucher, Sainte-Marie (CA); David Brault, Quebec (CA)

(73) Assignee: INNO-3B INC., St-Pacôme (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,915

(22) Filed: Oct. 27, 2021

(65) Prior Publication Data
US 2022/0046864 A1 Feb. 17, 2022

Related U.S. Application Data

(63) Continuation of application No. 16/050,853, filed on Jul. 31, 2018, now Pat. No. 11,185,016.
(Continued)

(51) Int. Cl.
*A01G 7/04* (2006.01)
*G01K 1/14* (2021.01)
(Continued)

(52) U.S. Cl.
CPC ............. *A01G 7/045* (2013.01); *A01G 9/249* (2019.05); *F21S 4/28* (2016.01); *F21S 8/04* (2013.01);
(Continued)

(58) Field of Classification Search
CPC ........ A01G 7/045; A01G 9/022; A01G 9/027; A01G 7/04; A01G 31/06; A01G 9/24;
(Continued)

(56) References Cited

U.S. PATENT DOCUMENTS

| 4,170,844 A | * 10/1979 | Steele | .................... A01G 31/06 47/29.1 |
| 4,504,894 A | 3/1985 | Reibling | |

(Continued)

FOREIGN PATENT DOCUMENTS

| EP | 0440274 A1 | 8/1991 |
| EP | 3326452 A1 | 5/2018 |
| WO | 2015058033 A1 | 4/2015 |

*Primary Examiner* — Abdullah A Riyami
*Assistant Examiner* — Syed M Kaiser
(74) *Attorney, Agent, or Firm* — Mintz Levin Cohn Ferris Glovsky and Popeo, P.C.

(57) ABSTRACT

A vertical farming layer structure comprising: an underlying support for supporting a plurality of farmed plants; a light-reflective upper surface positioned above and facing the underlying support, the light-reflective upper surface being adapted to reflect light by diffuse reflection; and a plurality of light-emitting devices positioned between the underlying support and the light-reflective upper surface, each light-emitting device being positioned to emit light along a respective optical axis oriented towards the light-reflective upper surface such that light emitted from the light-emitting device is at least partially diffusely reflected off of the light-reflective upper surface to reach the plants supported on the underlying support.

20 Claims, 13 Drawing Sheets

Related U.S. Application Data

(60) Provisional application No. 62/538,970, filed on Jul. 31, 2017.

(51) Int. Cl.
| | | |
|---|---|---|
| *A01G 9/24* | (2006.01) | |
| *H05B 45/14* | (2020.01) | |
| *F21Y 115/10* | (2016.01) | |
| *F21Y 103/00* | (2016.01) | |
| *F21V 29/57* | (2015.01) | |
| *F21V 7/00* | (2006.01) | |
| *F21V 29/503* | (2015.01) | |
| *G01N 25/66* | (2006.01) | |
| *F21S 8/04* | (2006.01) | |
| *F21S 4/28* | (2016.01) | |
| *G01K 13/02* | (2021.01) | |

(52) U.S. Cl.
CPC .......... *F21V 7/0008* (2013.01); *F21V 7/0066* (2013.01); *F21V 29/503* (2015.01); *F21V 29/57* (2015.01); *G01K 1/14* (2013.01); *G01K 13/02* (2013.01); *G01N 25/66* (2013.01); *H05B 45/14* (2020.01); *F21Y 2103/00* (2013.01); *F21Y 2115/10* (2016.08)

(58) Field of Classification Search
CPC .......... A01G 9/245; A01G 9/249; A01G 9/12; A01G 1/001; F21V 7/0066; F21V 23/00; F21V 29/83; F21V 29/59; F21V 29/57; F21V 29/503; F21Y 2115/10; G01K 1/14; G01N 25/66
See application file for complete search history.

(56) References Cited

U.S. PATENT DOCUMENTS

| | | | |
|---|---|---|---|
| 4,594,646 A | 6/1986 | Von Kohorn et al. | |
| 4,874,225 A | 10/1989 | Pruszenski, Jr. | |
| 4,992,917 A * | 2/1991 | Earnshaw | A01G 7/045 |
| | | | 362/373 |
| 9,060,468 B2 | 6/2015 | Klase et al. | |
| 9,335,038 B2 | 5/2016 | Stanley | |
| 9,357,718 B1 | 6/2016 | Lehman et al. | |
| 10,085,385 B2 * | 10/2018 | Yajima | A01G 7/045 |
| 11,185,016 B2 * | 11/2021 | Brault | H05B 45/14 |
| 2011/0060103 A1 | 3/2011 | Marchand | C08F 297/08 |
| | | | 525/89 |
| 2012/0068615 A1 * | 3/2012 | Duong | F21V 5/007 |
| | | | 313/503 |
| 2013/0326950 A1 | 12/2013 | Nilles | |
| 2015/0138752 A1 * | 5/2015 | Katona | F21V 5/10 |
| | | | 362/373 |
| 2015/0313090 A1 * | 11/2015 | Weiss | A01G 7/045 |
| | | | 250/453.11 |
| 2016/0088804 A1 * | 3/2016 | Ooi | A01G 7/045 |
| | | | 47/17 |
| 2016/0192599 A1 * | 7/2016 | Yajima | A01G 9/249 |
| | | | 362/227 |
| 2016/0360712 A1 * | 12/2016 | Yorio | A01G 31/06 |
| 2017/0027112 A1 * | 2/2017 | Vail | A01G 9/24 |
| 2017/0034895 A1 | 2/2017 | Vogel | |
| 2017/0104426 A1 * | 4/2017 | Mills | C25B 1/04 |
| 2017/0135290 A1 * | 5/2017 | Sahni | F21S 4/28 |
| 2017/0142910 A1 | 5/2017 | Johnson et al. | |
| 2017/0181393 A1 * | 6/2017 | Nelson | A01G 27/00 |
| 2017/0196176 A1 | 7/2017 | Griffin | |
| 2017/0254517 A1 * | 9/2017 | Nijkamp | E04C 2/52 |
| 2017/0354099 A1 * | 12/2017 | Haughton | A01G 9/249 |
| 2018/0000024 A1 * | 1/2018 | Erickson | B05B 1/20 |
| 2018/0064037 A1 * | 3/2018 | Tyink | A01G 7/045 |
| 2018/0284016 A1 * | 10/2018 | Fujiyama | G01N 21/3554 |
| 2018/0343810 A1 * | 12/2018 | Counne | A01G 9/022 |
| 2018/0352755 A1 * | 12/2018 | Szoradi | A01G 7/045 |
| 2019/0174682 A1 * | 6/2019 | Usami | A01G 7/00 |
| 2019/0246571 A1 * | 8/2019 | Ingram-Tedd | A01G 9/246 |
| 2020/0003395 A1 * | 1/2020 | Boonekamp | F21V 7/0025 |
| 2020/0124263 A1 * | 4/2020 | Van Rijswijk | G02B 6/0055 |
| 2020/0326044 A1 * | 10/2020 | Haenen | H05B 47/155 |

* cited by examiner

VERTICAL FARMING LAYER STRUCTURE AND METHOD FOR VERTICAL FARMING USING THE SAME

RELATED PATENT APPLICATION

The present application is a continuation of U.S. Ser. No. 16/050,853 filed on Jul. 31, 2018, which claims the benefit of U.S. Provisional Patent application No. 62/538,970 filed on Jul. 31, 2017, the entire contents of which are incorporated herein by reference.

TECHNICAL FIELD

The technical field generally relates to farming, and more precisely to vertical farming layer structures and to methods for vertical farming using the same. The technical field also relates to control systems for light fixtures, and more precisely to condensation control systems and to methods for controlling condensation in a light fixture. The technical field also relates to control systems for light-emitting diodes, and more precisely to control systems and methods for controlling electric current fed to at least one light-emitting diode.

BACKGROUND

Vertical farming is the practice of cultivating plants in vertically stacked layer structures, typically indoors. This type of farming makes use of new farming techniques, such as controlling the farming environment and making use of new equipment, such as artificial light. It also introduces various new challenges over traditional methods of farming.

Vertical farming system includes multiple devices and sub-systems adapted to control environmental factors to promote the growth of plants in the system. One of these factors is the provision of light to the plants to promote the growth of the plants through photosynthesis.

In most vertical farming systems, light is usually provided to the plants via a lighting system which emits artificial light to the plants. To simulate the provision of natural light by the sun, most lighting systems are further configured to provide light to the plants from above the plants.

For example, FIG. 1 shows a conventional vertical farming layer structure 10 of a vertical farming system as commonly known in the art. The conventional vertical farming layer structure 10 includes an underlying support 12 upon which a plurality of plants 14 to be farmed can be supported. A plurality of direct light fixtures 16 are positioned above the plurality of plants 14 and emit light directly onto the plants 14. "Directly emitting light onto the plants" herein refers to light being emitted from the direct light fixtures 16 travelling over a direct path and substantially without reflection to reach the plants 14.

As illustrated in FIG. 1, the direct light fixtures 16 are oriented downwardly towards the plants 14 and the underlying support 12. Light emitted from each direct light fixture 16 is represented by a light cone 18. Light from light fixtures 16 that are located in proximity of one another can overlap, which can provide some homogeneity in light intensity received at the plants 14. However, it was observed that due to the direct light fixtures 16 being spaced from one another, the direct light fixture 16 must be spaced from the plants 14 by at least by a minimum vertical distance 20 in order to achieve the desired homogeneity in light intensity. This required distance 20 further contributes to a minimum height requirement 22 of the vertical farming layer structure 10. It was further observed that this height requirement 22 decreased the number of farming layer structures that can be used within a vertical farming system within a given farming vertical space (i.e. the height of the space being occupied by the multiple layer structures of the vertical farming system).

Furthermore, the light-emitting device could generate heat, which could undesirably affect the system. For example, the light-emitting device may include one or more light-emitting diodes (or LEDs). In this case, the heat may cause a rise of temperature at or near the LEDs, which may lead to the LEDs functioning inefficiently or even to failure of the LEDs if the temperature increases over a certain temperature threshold.

To reduce the heat emitted by the light-emitting device, a coolant circuit in which a coolant circulates may be provided. Unfortunately, in the relatively humid environment inside a vertical farming system, condensation may tend to form on such coolant circuits. Condensation may reduce the performance of the light-emitting device or may even damage the lighting system.

It would therefore be desirable to provide a vertical farming system which would alleviate and even overcome at least one of the above-identified drawbacks.

SUMMARY

According to one aspect, there is provided a vertical farming layer structure comprising: an underlying support for supporting a plurality of farmed plants; a light-reflective upper surface positioned above and facing the underlying support, the light-reflective upper surface being adapted to reflect light by diffuse reflection; and a plurality of light emitting devices positioned between the underlying support and the light-reflective upper surface, each light-emitting device being positioned to emit light along a respective optical axis oriented towards the light-reflective upper surface such that light emitted from the light-emitting device is at least partially diffusely reflected off of the light-reflective upper surface to reach the plants supported on the underlying support.

In one embodiment, the light reflective surface is adapted to diffuse more than 80% of the light directed towards the light-reflective upper surface for light in at least a portion of a range of wavelengths comprised between 400 nm and 1400 nm.

In one embodiment, the light reflective surface is adapted to diffuse more than 96% of the light directed towards the light-reflective upper surface for light having a wavelength comprised between 400 nm and 780 nm.

In one embodiment, the plurality of light-emitting devices includes a first plurality of light-emitting devices configured for emitting light at a first wavelength and a second plurality of light-emitting devices configured for emitting light at a second wavelength different from the first wavelength.

In one embodiment, the first and second wavelengths are comprised between 400 nm and 1400 nm.

In one embodiment, the first and second wavelengths are comprised between 400 nm and 780 nm.

In one embodiment, the first plurality of light-emitting devices is further configured to emit light at a first intensity and the second plurality of light-emitting devices is configured to emit light at a second intensity different from the first intensity.

In one embodiment, the optical axis of each light-emitting device is non-vertical.

In one embodiment, the light-reflective upper surface is planar and further wherein the optical axis of each light-emitting device is angled relative to the light-reflective upper surface.

In one embodiment, the optical axis of each light-emitting device is angled at an angle of between 3 degrees and 9 degrees above a horizontal plane.

In one embodiment, the optical axis of each light-emitting device is angled at an angle of 6 degrees above the horizontal plane.

In one embodiment, the vertical farming layer structure further comprises a plurality of light fixtures, each light fixture supporting a respective pair of the plurality of light-emitting devices.

In one embodiment, for each light fixture, a first of the pair of the light-emitting devices is retained on a first lateral side of the fixture and a second of the pair of the light-emitting devices is retained on a second lateral side of the fixture opposite the first lateral side.

In one embodiment, the light fixtures are elongated and are disposed parallel to each other in a common horizontal plane, the light fixtures being further spaced apart from each other in a transversal direction by a distance of 24 inches.

In one embodiment, the light-emitting devices are light-emitting diodes.

In one embodiment, the light-emitting diodes are secured to a substrate panel and are disposed in at least one row on the substrate panel.

In one embodiment, the at least one row includes a first row and a second row extending parallel to the second row.

According to another aspect, there is provided a vertical farming layer system comprising a plurality of farming layer structures as described above, the vertical farming layer structures being arranged in a stacked arrangement.

According to yet another aspect, there is also provided a method for vertical farming, the method comprising: positioning a plurality of farmed plants on an underlying support; providing a light-reflective upper surface above and facing the plurality of plants, the light-reflective upper surface being adapted to reflect light by diffuse reflection; emitting light from a plurality of light-emitting devices positioned between the underlying support and the light-reflective upper surface, the light being emitted from each light-emitting device along a respective optical axis oriented towards the light-reflective upper surface such that the light is at least partially diffusely reflected off of the light-reflective upper surface to reach the plants supported on the underlying support.

In one embodiment, the light reflective surface is adapted to diffuse more than 80% of the light directed towards the light-reflective upper surface for light in at least a portion of a range of wavelengths comprised between 400 nm and 1400 nm.

In one embodiment, the light reflective surface is adapted to diffuse more than 96% of the light directed towards the light-reflective upper surface for light having a wavelength comprised between 400 nm and 780 nm.

In one embodiment, the optical axis of each light-emitting device is non-vertical.

In one embodiment, the light-reflective upper surface is planar and further wherein the optical axis of each light-emitting device is angled relative to the light-reflective upper surface.

According to yet another aspect, there is also provided a condensation control system for a light fixture, the condensation control system comprising: a cooling circuit in fluid communication with the light fixture, the cooling circuit having at least one flow regulator for regulating the flow of coolant through the cooling circuit; a coolant temperature sensor configured to monitor a temperature of the coolant; at least one environmental condition sensor configured to monitor at least one environmental condition in a space in proximity of the light fixture; a controller operatively connected to the at least one environmental condition sensor, to the coolant temperature sensor, and to the flow regulator and configured for: receiving at least one environmental condition measurement from the at least one environmental condition sensor and from the coolant temperature sensor; receiving a coolant temperature measurement from the coolant temperature sensor; determining a condensation threshold temperature based on the received at least one environmental condition measurement; comparing the received coolant temperature measurement with the determined condensation threshold temperature; and controlling the at least one flow regulator to maintain the temperature of the coolant within the cooling circuit above the determined condensation threshold temperature.

In one embodiment, the flow regulator comprises a variable pump for controlling flow rate of coolant within the cooling circuit and a valve for controlling a flow of new coolant introduced into the cooling circuit.

In one embodiment, the at least one environmental condition sensor comprises: a hygrometer for measuring a relative humidity within the space in proximity of the light fixture, the hygrometer being operatively connected to the controller for providing the measured relative humidity to the controller; a thermometer for measuring a temperature within the space in proximity of the light fixture, the thermometer being operatively connected to the controller for providing the measured temperature to the controller, the controller being configured for determining the condensation threshold temperature based, at least in part, on the measured relative humidity and the measured temperature.

According to still another embodiment, there is also provided a method for controlling condensation on a light fixture, the method comprising: providing a cooling circuit for cooling the light fixture, the cooling circuit having at least one flow regulator for regulating the flow of coolant through the cooling circuit; measuring at least one environmental condition within a space in proximity of the light fixture; determining a condensation threshold temperature based on the received one or more measurements of the at least one environmental condition; monitoring a temperature of the coolant within the cooling circuit; and controlling the flow regulator to maintain the temperature of the coolant within the cooling circuit above the determined condensation threshold temperature.

In one embodiment, the flow regulator comprises a variable pump for controlling flow rate of coolant within the cooling circuit and a valve for controlling the flow of new coolant into the cooling circuit.

In one embodiment, measuring the at least one environmental condition comprises measuring a relative humidity and a temperature in the space in proximity of the light fixture.

In one embodiment, determining the condensation threshold temperature comprises determining a light fixture condensation temperature representing a temperature at which the light fixture is susceptible to condensation for the received at least one environmental condition, the condensation threshold temperature being determined, in part, based on a predetermined temperature offset between a measured temperature of the coolant and an effective temperature of the light fixture for the temperature of the coolant.

In one embodiment, controlling the flow regulator comprises, if the monitored temperature is below the condensation threshold temperature, decreasing the flow rate of the coolant within the cooling circuit.

In one embodiment, controlling the flow regulator further comprises, if the monitored temperature is above a first intermediate threshold temperature higher than the condensation threshold temperature, increasing the flow rate of the coolant within the cooling circuit.

In one embodiment, controlling the flow regulator further comprises, if the monitored temperature is above a second intermediate threshold temperature higher than the first intermediate threshold temperature, introducing new coolant into the cooling circuit.

According to yet another aspect, there is provided a current control system for controlling electric current fed to at least one light-emitting diode, the system comprising: a thermometer configured for monitoring temperature of the at least one light-emitting diode; a light sensor configured for monitoring light intensity emitted from the at least one light emitting diode; a variable current source operatively connected to the at least one light-emitting diode and configured for providing a variable level of current to the at least one light-emitting diode; and a controller operatively connected to the thermometer, the light sensor, and the variable current source and configured for: receiving the monitored temperature and the monitored light intensity; and controlling the variable current source to adjust a current fed to the at least one light-emitting diode according to: if the monitored light intensity is below a predetermined target light intensity and the monitored temperature is below a predetermined temperature threshold, increasing the level of current provided to the at least one light-emitting diode; and if the monitored temperature exceeds the predetermined temperature threshold, decreasing the level of current provided to the at least one light-emitting diode.

In one embodiment, the at least one light emitting diode comprises a plurality of light-emitting diodes connected in series, and further wherein the thermometer is configured to monitor the temperature on a die of the light-emitting diode located furthest from the variable current source along the series connection.

According to yet another aspect, there is also provided a condensation-controlled lighting system comprising: a light fixture comprising a plurality of light-emitting diodes; the current control system as described above for controlling electric current fed to a plurality of light-emitting diodes of the light fixture; and the condensation control system as described above for controlling condensation of the light fixture.

According to yet another aspect, there is also provided a method for controlling electric current fed to at least one light-emitting diode, the method comprising: monitoring temperature on a die of the at least one light-emitting diode; monitoring light intensity emitted from the at least one light emitting diode; and controlling current fed from a variable current source to the at least one light-emitting diode according to: if the monitored light intensity is below a predetermined target light intensity and the monitored temperature is below a predetermined temperature threshold, increasing the level of current provided to the at least one light-emitting diode; and if the monitored temperature exceeds the predetermined temperature threshold, decreasing the level of current provided to the at least one light-emitting diode.

In one embodiment, the electric current is fed to a plurality of light-emitting diodes connected in series, and wherein temperature is monitored on the die of the light-emitting diode located furthest from the variable current source along the series connection.

According to still another aspect, there is also provided a method for controlling a lighting light fixture having at least one light emitting diode, the method comprising: monitoring temperature of the at least one light-emitting diode; monitoring light intensity emitted from the at least one light emitting diode; and controlling current fed from a variable current source to the at least one light-emitting diode according to: if the monitored light intensity is below a predetermined target light intensity and the monitored temperature is below a predetermined temperature threshold, increasing the level of current provided to the at least one light-emitting diode; and if the monitored temperature exceeds the predetermined temperature threshold, decreasing the level of current provided to the at least one light-emitting diode; providing a cooling circuit for cooling the lighting light fixture, the circuit having at least one regulator for regulating the flow of coolant through the cooling circuit; measuring at least one environmental condition within a space in proximity of the lighting system; determining a condensation threshold temperature based on the received one or more measurements of the at least one environmental condition; monitoring a temperature of the coolant within the cooling circuit; and controlling the at least one regulator of the cooling circuit to maintain the temperature of the coolant within the circuit above the determined condensation threshold temperature.

DETAILED DESCRIPTION

Figure 1:
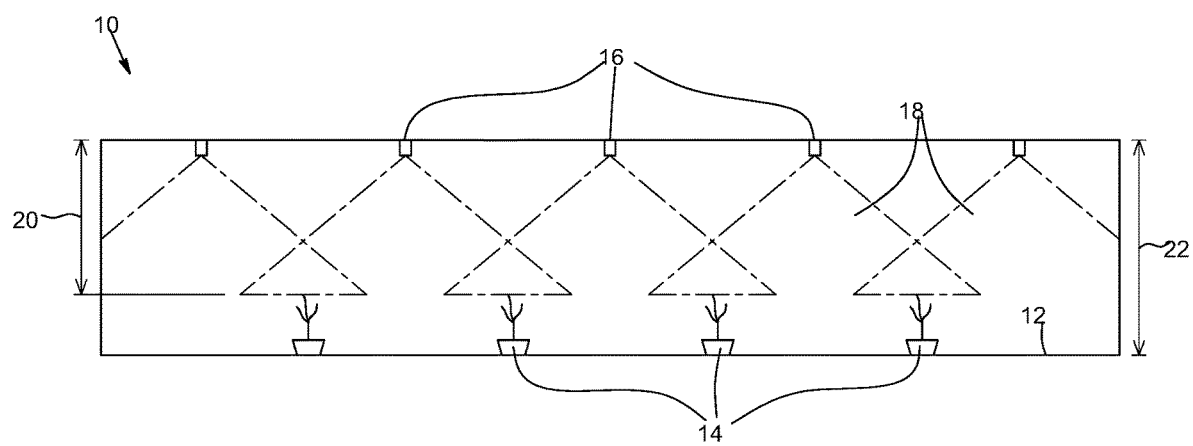
FIG. 1 is a schematic side view showing a vertical farming layer structure including a lighting system of the prior art.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "top", "bottom", "forward", "rearward" "left", "right" and the like should, unless otherwise indicated, be taken in the context of the figures and correspond to the position and orientation in the vertical farming system and corresponding parts when being used, with the "top", "above" corresponding to a position closer to a roof (or ceiling) of a vertical farming layer structure and the "below", "bottom" corresponding to a position closer to a floor of a vertical farming layer structure. Positional descriptions should not be considered limiting.

Figure 2A:
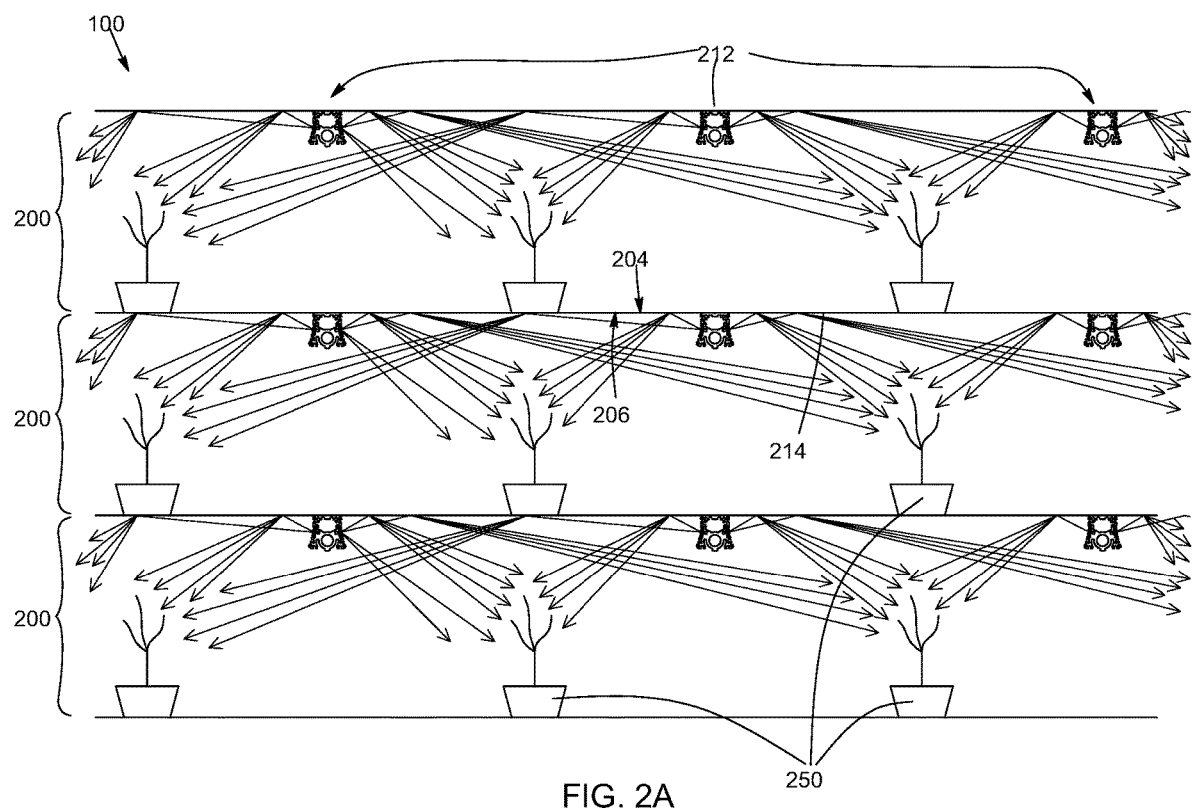
FIG. 2A is a schematic side view showing a vertical farming system including a plurality of vertical farming layer structures, in accordance with one embodiment.
Figure 2B:
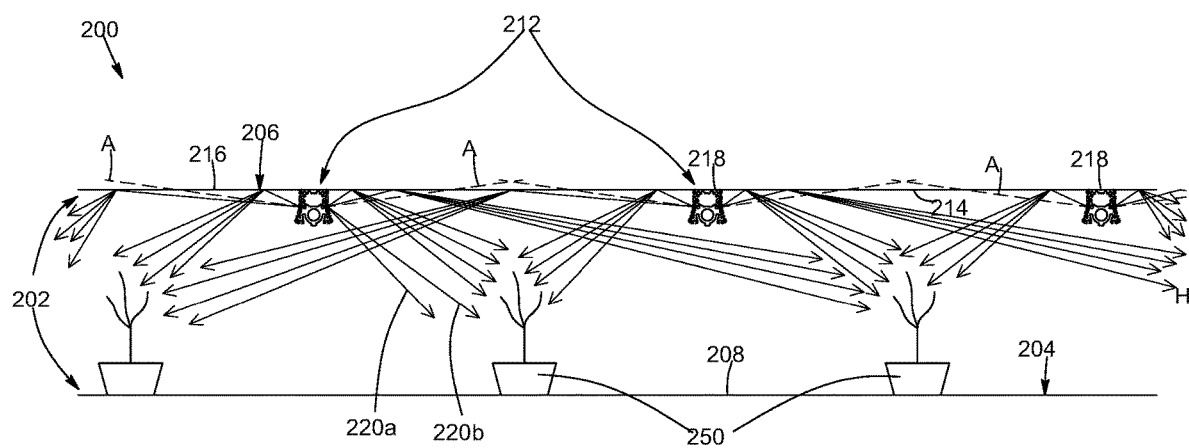
FIG. 2B is a schematic side view showing a vertical farming layer structure for the vertical farming system illustrated in FIG. 2.

Referring now to FIGS. 2A and 2B, there is shown a vertical farming system 100 including a plurality of vertical farming layer structures 200, in accordance with one embodiment.

As shown in FIG. 2A, the plurality of vertical farming layer structures 200 are similar to each other and are stacked on top of each other. In the illustrated embodiment, three vertical farming layer structures 200 are shown stacked on top of each other. However, the vertical farming system 100 could include additional vertical farming layer structures similar to the vertical farming layer structures 200 and located below and/or above the illustrated vertical farming layer structures 200.

Each vertical farming layer structure 200 includes a housing structure 202 which is configured for receiving a plurality of plants 250. More specifically, the housing structure 202 includes a floor 204, a roof 206 located above the floor 204 and spaced vertically from the floor 204 and a roof-bearing structure, not shown, extending between the floor 204 and the roof 206 for maintaining the roof 206 spaced from the floor 204.

In one example, the roof-bearing structure could include a plurality of supporting posts or walls which extend upwardly and generally vertically from a ground surface, and the floor 204 of each vertical farming layer structure 200 could extend generally horizontally between the corner posts. In this configuration, the floor 204 of the vertical farming layer structure 200 could define the roof 206 of a vertical farming layer structure positioned immediately below the vertical farming layer structure 200. Alternatively, the vertical farming layer structures 200 may be arranged within the vertical farming system 100 according to one of various other configurations.

In the illustrated embodiment, the floor 204 defines a generally planar and horizontal underlying support 208 on which plants 250 may be received and supported. More specifically, the plants 250 are all disposed side-by-side directly on the floor 204 and are therefore all generally at the same vertical height.

Alternatively, instead of being defined by the floor 204 of the housing structure 202, the underlying support 208 could include an elevated surface which is spaced vertically above the floor 204. In yet another embodiment, instead of being horizontal, the underlying support 208 could have another configuration, such as a stepped configuration, which would allow the plants 250 to be supported at different heights.

The vertical farming layer structure 200 further comprises a lighting system 210 for providing light to the plants 250 supported by the underlying support 208. More specifically, the lighting system 210 includes a plurality of light-emitting devices 212 which are positioned above the underlying support 208.

In the illustrated embodiment, in contrast to the vertical farming system 10 of the prior art illustrated in FIG. 1, the light-emitting devices 212 are configured to provide light indirectly, at least partially, to the plants 250 supported by the underlying support 208.

More specifically, the vertical farming layer structure 200 includes a light-reflective upper surface 214 which is oriented downwardly towards the plants 250. The light-emitting devices 212 are located between the light-reflective upper surface 214 and the underlying support 208 and the plants 250 received on the underlying support 208, and are adapted to emit light at least partially towards the light-reflective upper surface 214, which reflects the light downwardly towards the underlying support 208 and the plants 250.

In the illustrated embodiment, the light-reflective upper surface 214 is defined on a lower surface 216 of the roof 206. More specifically, the light-reflective upper surface 214 may be formed by coating the lower surface 216 of the roof 206 with a reflective material, or by manufacturing the roof 206 in an appropriate material and by providing an appropriate finish on the lower surface 216 of the roof 206 to allow the lower surface 216 of the roof 206 to be suitably reflective. Alternatively, the light-reflective upper surface 214 could be distinct from the roof 206. For example, the light-reflective upper surface 214 may be defined on a reflector panel which is suspended from the roof 206 or which extends laterally from the supporting posts or walls of the vertical farming system 100.

Furthermore, the roof 206 extends generally horizontally, such that the lower surface 216 of the roof 206 is generally planar. Alternatively, in an embodiment in which the light-reflective upper surface 214 is defined on a reflector panel distinct from the roof 206, the light-reflective upper surface 214 may instead be concavely or convexly curved or have any other profile which a skilled person would consider to be suitable.

In the illustrated embodiment, the vertical farming layer structure 200 further includes a plurality of light fixtures 218 adapted to be positioned near the light-reflective upper surface 214. The light fixtures are further adapted to receive and position the light-emitting devices 212 in a desired orientation. Specifically, each light-emitting device 212 is adapted to emit light along a beam axis or optical axis A, which generally defines an orientation of the light-emitting device 212. In the illustrated embodiment, the light fixtures 218 are adapted to orient the light-emitting devices 212 such that the optical axis of the light-emitting devices is angled upwardly towards the light-reflective upper surface 214.

It was observed that positioning the light-emitting devices 212 to emit light that is at least partially reflected off of the light-reflective upper surface 214 allows achieving substantially homogeneous light intensity at the plants 250 while decreasing a required vertical distance D between the light-emitting devices 212 and the plants 250 (when compared to the minimum distance 20 of the vertical farming system 10 commonly known in the art). In one experimental vertical farming layer structure in which light was provided to the plants at least partially by reflection, the distance D between light emitting devices 124 and the plants 250 was smaller than the distance 20 between light emitting devices 16 and plants 14 of the vertical farming system 10 commonly known in the art by a factor of almost 4 times (5.467 in. vs 20 in.). Accordingly, the required minimum height H of the vertical farming layer structure 200 is also substantially decreased (when compared to the minimum required height 22 of the vertical farming layer structure 10 commonly known in the art). In the experimental vertical farming layer structure, the height H of the layer structure 200 was smaller than the minimum required height 22 of the vertical farming layer structure 10 commonly known in the art by a factor of about 2 (13.434 in. vs 27.967 in.). It will be appreciated that the smaller height H of the vertical farming layer structure 200 described herein according to various example embodiments allows for providing more vertical farming layer structures 200 within a same vertical farming system 100 when compared to a vertical farming system including a plurality of the vertical farming layer structure 10 commonly known in the art.

It was further observed that the reflected-light farming layer structure 200 exhibited more loss in light intensity received at the plants versus the vertical farming layer 1 commonly known in the art for the same intensity of light output from the light-emitting devices. In some circumstances, the loss in light intensity may be equal to about 4% versus the vertical farming layer structure 10 commonly known in the art. Accordingly, intensity of light emitted from the plurality of light-emitting devices 124 may need to be increased to achieve the same light intensity at the plants 116, which may further lead to higher energy requirements. However, this higher energy requirement may be offset by the ability to grow more plants 116 within the same vertical farming space, which would ultimately result in a higher financial return for the user.

In the illustrated embodiment, the light is emitted relatively diffusely from the light-emitting device 212, as shown in FIG. 2B. Specifically, the light substantially diverges from the light-emitting device 212 as it travels away from the light-emitting device 212 such that at least some light rays from the light-emitting device 212 are angled relative to the optical axis A. Specifically, the light emitted from the light-emitting device 212 may define a substantially conical light envelope. Some light rays emitted from the light-emitting device 212, such as rays 220a, 220b, could therefore be angled downwardly from the horizontal. In this case, these light rays would be oriented downwardly towards the underlying support and may provide light directly to the plants 250 received on the underlying support 208. In this embodiment, a portion of the light emitted by the light-emitting device 212 would be provided directly to the plants 250 and another portion would be reflected off of the light-reflective upper surface 214 and would be provided indirectly by reflection to the plants 250. It will be appreciated that in this case, the light provided directly to the plants 250 mixes with the light provided indirectly by reflection and further contributes to the homogeneity of the light upon reaching the plants 250. This embodiment therefore generally provides the same benefits as an embodiment in which the light emitted by the light-emitting device 212 is entirely reflected off of the light-reflective upper surface 214.

In the present embodiment, the light-reflective upper surface 214 is further adapted to reflect light towards the plants 250 by diffuse reflection, rather than purely by specular reflection. Specifically, it has been observed that diffuse light is more efficient than direct light or light reflected by specular reflection for the photosynthesis of plants. This may result in plants being healthier, growing faster and therefore being harvestable quicker, and/or growing to a bigger size, which may lead to increased financial returns for the user.

The light-reflective upper surface 214 is therefore made of a highly reflective and diffusive material, such as baked powder coat paint, commercial flat ceiling white paint or a commercial highly-diffusive reflective film, which has been selected for its relative high reflection and diffusion properties. In one embodiment, the highly reflective and diffusive material may be applied on the lower surface 216 of the roof 206 to thereby form the light-reflective upper surface 214. In another embodiment, the light-reflective upper surface 214 may instead be manufactured from anodized reflective aluminum with a textured surface such as a pebble surface.

In one embodiment, the light-reflective upper surface 214 may diffusely reflect more than 80% of the light directed towards the light-reflective upper surface 214 for light in at least a portion of a range comprised between 400 nm, which corresponds generally to the lower limit of the visible light spectrum, to 1400 nm, which generally corresponds to the upper limit of the near-infrared spectrum.

In some circumstances, the reflective material may provide more than 90%, or more specifically about 96%, of reflective diffusion for light having a wavelength comprised between 400 nm and 780 nm. In other words, about 96% of all light having a wavelength between 400 nm and 780 nm directed towards the light-reflective upper surface 214 by the light-emitting device 212 could be reflected by diffuse reflection towards the plants 250 received on the underlying support 208.

In another example, the light-reflective upper surface 214 may be covered by domestic white ceiling paint. In some circumstances, the domestic white ceiling paint could provide 92.5% of reflective diffusion for light having a wavelength of 650 nm.

In the embodiment illustrated in FIG. 2, the light fixtures 218 are generally elongated and are disposed parallel to each other in a common horizontal plane. Specifically, the light fixtures 218 are disposed against the lower surface 216 of the roof 206. Alternatively, the light fixture 218 could instead be spaced downwardly from the lower surface 216 of the roof 206.

Still in the embodiment illustrated in FIG. 2, the light fixtures 218 are further spaced apart from each other in a transversal direction by a distance of 24 inches. Alternatively, the light fixtures 218 may be spaced apart from each other by any other distance which would be considered by a skilled person to be suitable.

Figure 3:
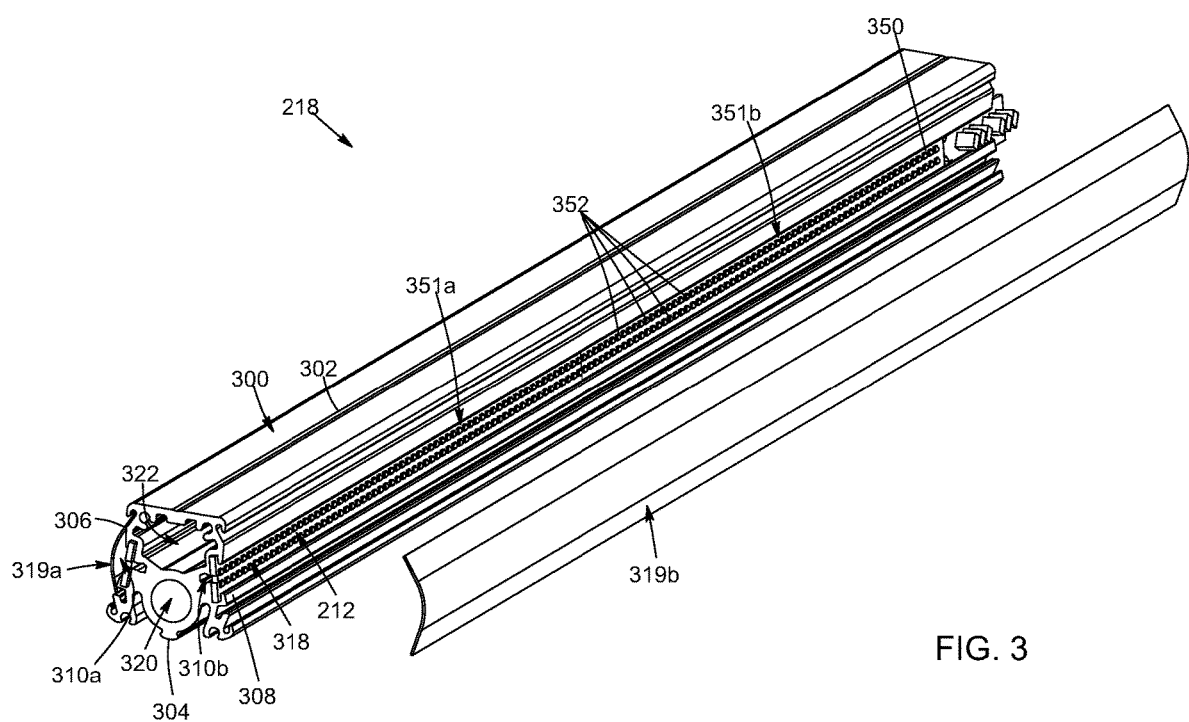
FIG. 3 is a partially-exploded perspective view of a light fixture and of a plurality of light-emitting devices for the vertical farming layer structure illustrated in FIG. 2A, with the light-emitting devices mounted to the light fixture and with a protection panel exploded off of the fixture body.
Figure 4:
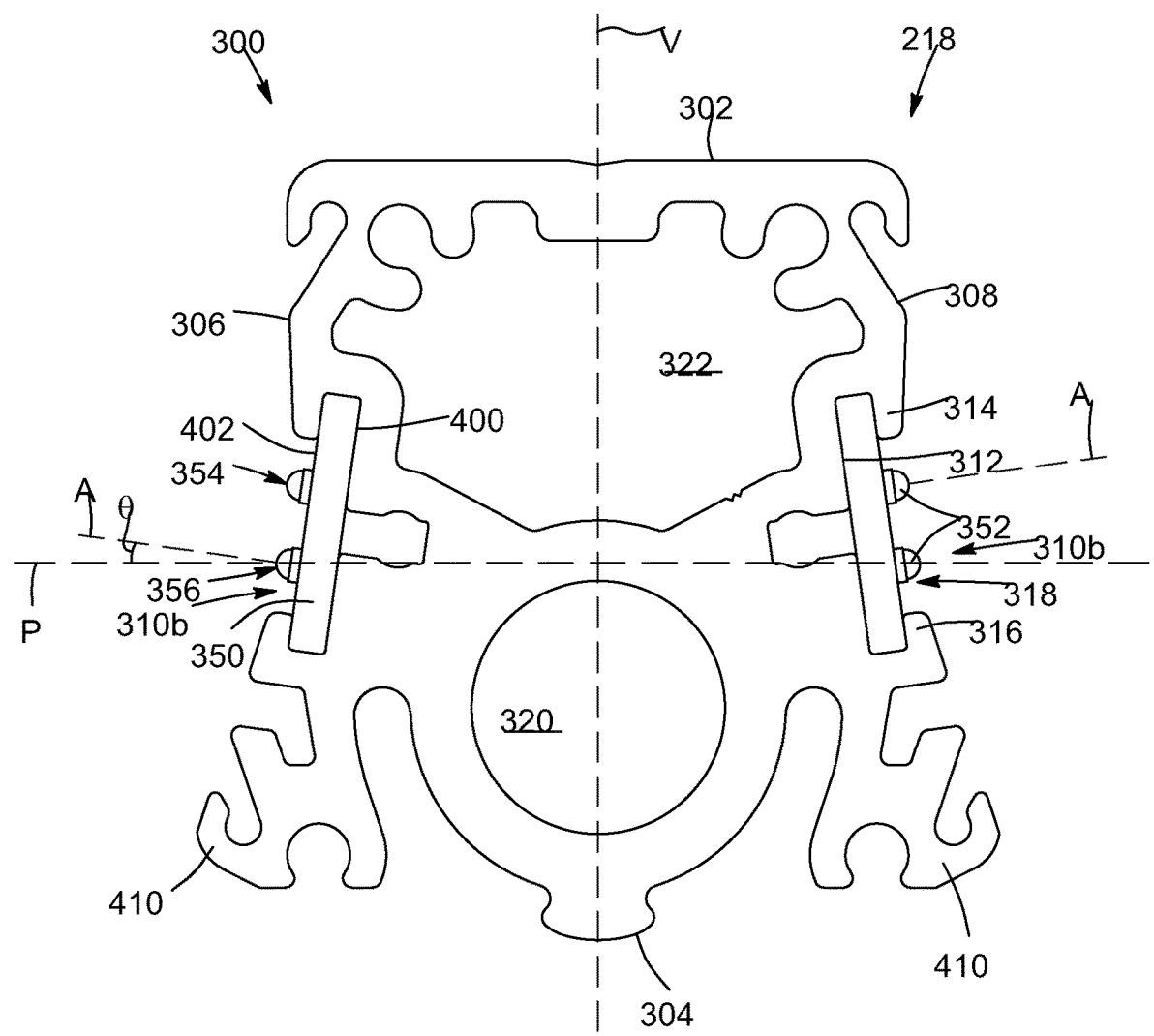
FIG. 4 is an end elevation view of the light fixture with the light-emitting devices illustrated in FIG. 3.

Referring now to FIGS. 3 and 4, the light fixture 218 includes an elongated fixture body 300 which is adapted to receive a pair of light-emitting devices 212a, 212b.

In the illustrated embodiment, the fixture body 300 is made of a thermally-conductive material such as a metal. For example, the fixture body 300 may be made of aluminium or of an aluminium alloy such as 6360-T5 aluminium alloy. Alternatively, the fixture body 300 may be made of any other thermally-conductive material which a skilled person would consider to be suitable.

In one embodiment, the fixture body 300 may be formed by extrusion. Alternatively, the fixture body 300 may be made using any other manufacturing technique which a skilled person would consider to be appropriate.

Still referring to FIGS. 3 and 4, the fixture body 300 includes a top end 302, a bottom end 304 and a pair of lateral sides 306, 308 which extend between the top end 302 and the bottom end 304.

In the illustrated embodiment, the fixture body 300 is adapted to be secured to the roof 206 of the vertical farming layer structure 200 such that the top end 302 is located towards the roof 206 and the bottom end 304 is located towards the floor 204 of the vertical farming layer structure 200. When secured to the roof 206 of the vertical farming layer structure 200, the fixture body 300 is further oriented so as to be generally symmetrical about a vertical axis of symmetry V, as shown in FIG. 4.

In one embodiment, the light fixture 218 could include a fixation member adapted to engage a receiving member located on the roof 206. More specifically, the fixation member could be integrally formed with the fixture body 300. Alternatively, the light fixture 218 may not include a fixation member and could instead be secured to the roof 206 using one or more fasteners or any other securing technique which a skilled person would consider to be appropriate.

In another embodiment, instead of being secured to the roof 206, the fixture body 300 may be secured to the supporting walls of the vertical farming system 100 and extend into the vertical farming layer structure 200 along or near the roof. In yet another embodiment, the fixture body 300 may be held between against or near the roof by a fixture supporting structure which would be independent from the roof 206 and the supporting walls of the vertical farming system 100.

In the illustrated embodiment, the fixture body 300 includes a pair of mounting slots 310a, 310b, each one being defined in one of the lateral sides 306, 308 of the fixture body 300. Each mounting slot 310a, 310b is defined by a generally planar base surface 312 and top and bottom hook members 314, 316 which are spaced laterally outwardly from the base surface 312. Specifically, the top hook member 314 extends generally downwardly and the bottom hook member 316 extends generally upwardly towards the top hook member 314. The top and bottom hook members 314, 316 are further spaced apart to define an access opening 318 between the top and bottom hook members 314, 316.

Still in the illustrated embodiment, each light-emitting device 212 includes an elongated substrate panel 350 which has an inside panel face 400 and an outside panel face 402, and a plurality of light-emitting diodes 352 (or LEDs) secured to the outside panel face 402. As best shown in FIG. 3, the substrate panel 350 is sized and shaped to be received in a corresponding mounting slot 310a, 310b such that the inside panel face 400 lies against the mounting slot's base surface 312 and the outside panel face 402 faces outwardly away from the fixture body 300.

In one embodiment, the substrate panel 350 is slidably received in the mounting slots 310a, 310b. More specifically, each mounting slot 310a, 310b could have at least one open end through which the substrate panel can be inserted and slid longitudinally into the corresponding mounting slot 310a, 310b. Alternatively, the substrate panel 350 may not be slid into the corresponding mounting slot 310a, 310b and may instead be inserted in the mounting slot 310a, 310b in any other manner which a skilled person would consider appropriate.

In the illustrated embodiment, the substrate panel 350 includes first and second substrate panel sections 351a, 351b disposed end-to-end within the corresponding mounting slot 310a, 310b. Alternatively, the substrate panel 350 could include a single section extending substantially the entire length of the fixture body 300 or more than two substrate panel sections disposed end-to-end.

Still in the illustrated embodiment, the LEDs 352 include a first plurality of LEDs disposed in a first LED row 354 and a second plurality of LEDs disposed in a second LED row 356. In this embodiment, the first and second LED rows 354, 356 extend parallel to each other along the length of the substrate panel 350. The LED rows 354, 356 are generally centered on the substrate panel 350 and are therefore exposed through the access opening 318 such that the LEDs 352 can emit light through the access opening 318.

In one embodiment, the LEDs 352 in the first LED row 354 are further operatively connected together in series, and the LEDs 352 in the second LED row 356 are also operatively connected together in series. Alternatively, the LEDs 352 in the first LED row 354 and in the second LED row 356 could all be operatively connected together in series.

In one embodiment, the first plurality of LEDs 352 in the first LED row 354 are adapted to emit light which is different from the light emitted by the second plurality of LEDs 352 in the second LED row 356. In this embodiment, the light reflected on the light-reflective upper surface 214 and the light received by the plants 250 would therefore be a combination of the two types of light. For example, one of the first and second LED rows 354, 356 may be configured to emit red light having a wavelength of about 450 nm and the other one of the first and second LED rows 354, 356 may be configured to emit blue light having a wavelength of about 650 nm.

In a further embodiment, the intensity of the light emitted by the first LED row 354 and the second LED row 356 may not be the same. For example, the first LED row 354 may emit red light at a first intensity and the second LED row 356 may emit blue light at a second intensity which is about 9 times less than the intensity of the red light such that the combination of lights received by the plants 250 contain about 10% of blue light and 90% of red light.

Furthermore, the LEDs 352 may alternatively include more than two pluralities of LEDs disposed in more than two LED rows, and these additional pluralities of LEDs may be adapted to emit additional types of light at different wavelength. For example, the LEDs 352 could include a third plurality of LEDs disposed in a third LED row configured to emit green light having a wavelength of about 540 nm and in a fourth plurality of LEDs disposed in a fourth LED row configured to emit near infrared light at a wavelength of about 850 nm.

In another embodiment, instead of being disposed in two rows, the LEDs 352 from the first plurality of LEDs and the second plurality of LEDs could be disposed in a single row with the LEDs 352 from the first plurality of LEDs alternating with the LEDs 352 from the second plurality of LEDs. Alternatively, instead of being disposed in rows, the LEDs 352 could be disposed on the substrate panel 350 according to one of various alternative patterns.

In one embodiment, the LEDs 352 may be adapted to emit light having a wavelength comprised between 400 nm, which corresponds generally to the lower limit of the visible light spectrum, to 1400 nm, which generally corresponds to the upper limit of the near-infrared spectrum. As indicated above, in one embodiment, the light-reflective upper surface 214 may be adapted to diffusely reflect more than 80% of the light directed towards the light-reflective upper surface 214 for light having a wavelength comprised within this range. Using LEDs 352 which emit light having a wavelength which is restricted to this range would therefore ensure that 80% of all light emitted by the LEDs 352 is diffusely reflect towards the plants.

Furthermore, it was observed that light having a wavelength of between 400 nm and 780 nm is particularly beneficial in promoting the photosynthesis of plants. Accordingly, in a more specific embodiment, all of the LEDs 352 emit light having a wavelength of between 400 nm and 780 nm.

As best shown in FIG. 4, the optical axis A of each LED 352 extends generally though a center of the LED 352, perpendicularly to the substrate panel 350. As the LEDs 352 emit light diffusely, it will be understood that the optical axis A defines a general orientation of the light provided by the LED 352, but that at least some light rays emitted by each LED 352 are angled relative to the optical axis of the LED.

As shown in FIG. 4, the light fixture 218 is further configured such that the optical axis A of each LED 352 is not vertical but is rather angled relative to the vertical V. In the illustrated embodiment, since the light-reflective upper surface 214 is generally planar, the optical axis of the LED 352 is therefore also angled or non-perpendicular relative to the light-reflective upper surface 214. In the illustrated embodiment, the base surface 312 of the mounting slots 310a, 310b is angled relative to the vertical V such that the substrate panel 350 received in the corresponding mounting slot 310a, 310b is also angled relative to the vertical. In this configuration, the optical axis of the LED 352, being perpendicular to the substrate panel 350, is therefore also angled relative to the vertical.

Still in the illustrated embodiment, the optical axis A is slightly angled upwardly relative to a horizontally-extending axis (or relative to the floor). More specifically, the optical axis A is angled by an angle θ of about 6 degrees above a horizontal plane P. It will be appreciated that having an optical axis A which is angled relatively close to the horizontal will allow light from the LED to be reflected on the light-reflective upper surface 214 up to a relatively great lateral distance away from the light-emitting device 212, and therefore cover a relatively large surface area.

Furthermore, it was observed that in an embodiment in which the light fixtures 218 are spaced apart from each other in a transversal direction by a distance of about 24 inches and further in which the optical axis A is angled by an angle θ of about 6 degrees above the horizontal plane P, the light received by the plants disposed on the underlying support 208 had a relatively high level of homogeneity.

Alternatively, the light fixture 218 may be configured such that the optical axis A of the LEDs 352 is angled according to an angle θ of about between 3 degrees and 9 degrees above the horizontal plane P. In another embodiment, the optical axis A of the LEDs 352 may be angled to any other angle which a skilled person would consider suitable.

It will be appreciated that when the LEDs 352 are activated and emit light, the LEDs 352 may further undesirably generate heat. In the illustrated embodiment, the heat generated by the LEDs 352 may be at least partially transferred to the substrate panel 350 to which the LEDs 352 are secured.

Furthermore, since the inside panel face 400 of the substrate panel 350 lies against the base surface 312 of the corresponding mounting slot 310a, 310b and since the fixture body 300 is made of a thermally-conductive material, the substrate panel 350 is in thermal contact with the fixture body 300 and the heat from the LEDs 352 may therefore further be transferred from the substrate panel 350 to the fixture body 300.

In the illustrated embodiment, the fixture body 300 further includes a plurality of fin members 410 extending outwardly from the fixture body 300 to dissipate at least partially heat transferred from the LEDs 352 and through the fixture body 300.

Still in the illustrated embodiment, the light fixture 218 further includes a pair of elongated and convex protection panels 319a, 319b slidably engaging the fixture body 300 and extending over the access opening 318 of the mounting slots 310a, 310b. Each protection panel 319a, 319b is transparent to allow the light emitted from the LEDs 352 to pass through unhindered, while generally protecting the LEDs 352 and the substrate panel 350 from humidity and debris. Alternatively, the light fixture 218 may not include protection panels 319a, 319b.

Still referring to FIGS. 3 and 4, the fixture body 300 is further hollow and includes a lower channel 320 located near the bottom end 304 and extending longitudinally along the fixture body 300. In the illustrated embodiment, the lower channel 320 has a circular cross-section and is adapted to receive a coolant conduit, not shown, also having a corresponding circular cross-section. The coolant conduit may form part of a cooling circuit through which coolant may be circulated to absorb heat from the fixture body 300 and thereby regulate a temperature of the light fixture 218, as will be further explained below.

In one embodiment, the coolant fluid may simply be water. Alternatively, the coolant may be an ethylene glycol solution, a propylene glycol solution or another type of industrial coolant or heat transfer fluid.

The coolant conduit may further have the same diameter as the lower channel 320 such that a sidewall of the coolant conduit may contact the fixture body 300 substantially along the entire surface of the coolant conduit to thereby maximize heat absorption from the fixture body 300 to the coolant.

Alternatively, instead of receiving a distinct coolant conduit, the lower channel 320 itself could define the coolant conduit and coolant could circulate through the lower channel 320 to directly absorb heat from the fixture body 300.

In the illustrated embodiment, the fixture body 300 further includes an upper cavity 322 located near the top end 302 and which also extends longitudinally along the fixture body 300. The upper cavity 322 may be configured for receiving electrical and/or electronic components of the light-emitting devices 212, such as electrical circuits, drivers and connectors. The upper cavity 322 may further be used to house other sub-systems of the vertical farming layer structure 200. Alternatively, the fixture body 300 may not include the upper cavity 322.

Figure 5:
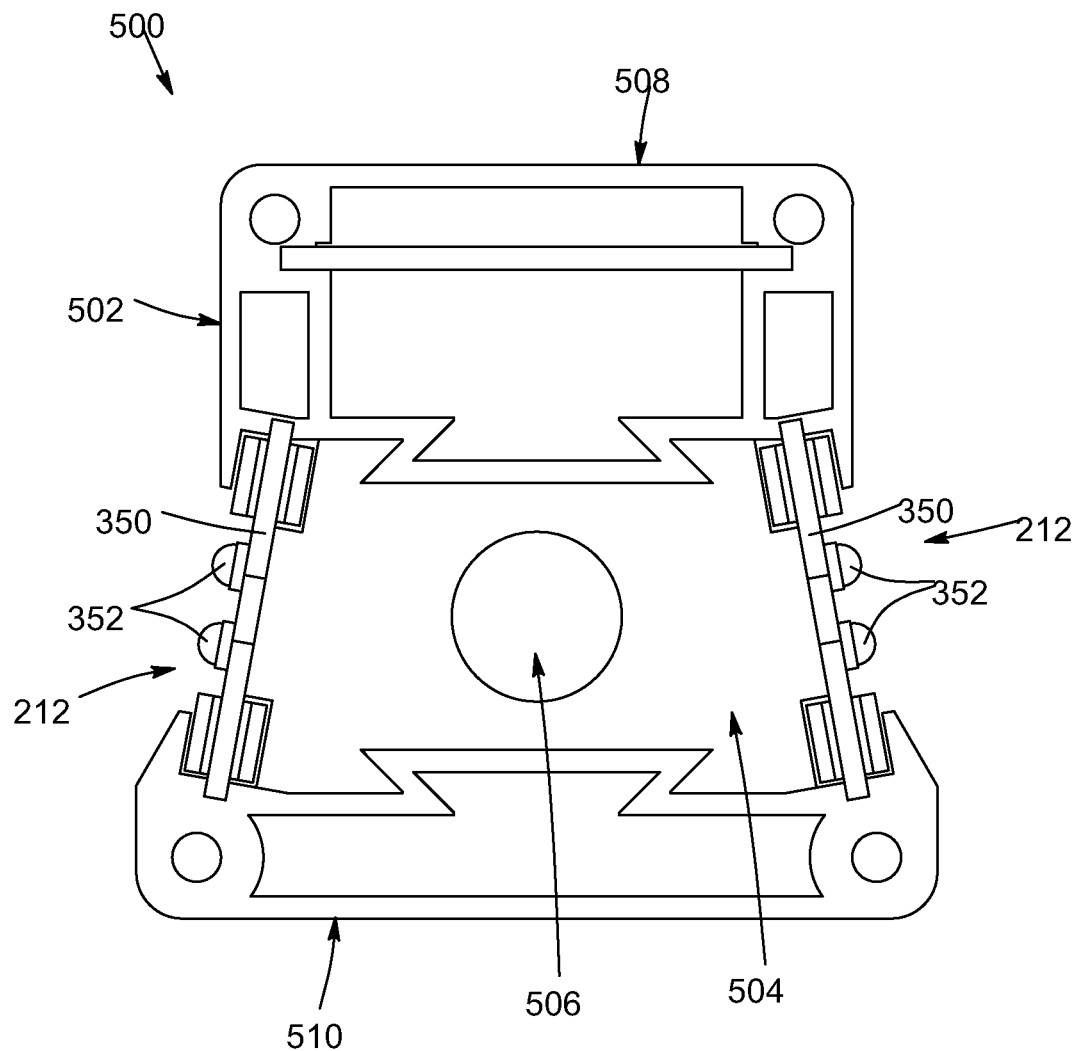
FIG. 5 is an end elevation view of a light fixture for a vertical farming layer structure, in accordance with another embodiment.

Turning now to FIG. 5, there is shown a light fixture 500, in accordance with an alternative embodiment. The light fixture 500 includes a fixture body 502 configured to receive the substrate panel 350 of the light-emitting devices 212. In this embodiment, the light fixture 500 is assembled from multiple parts manufactured from different materials. More specifically, the fixture body 502 includes a central portion 504 made from a thermally-conductive material, such as a metal. The central portion 504 contact the substrate panel 350 of the light-emitting devices 212 to allow heat generated from the LEDs 352 to be transferred to the central portion 504. Similarly to the fixture body 300, the fixture body includes a channel 506 defined in the central portion 504. The channel 506 is sized and shaped to receive a conduit from a cooling circuit to remove heat transferred to the central portion 504 of the fixture body 502.

The fixture body 502 further includes an upper portion 508 coupled to the central portion 504. The upper portion 508 may be formed of a thermally insulating material, such as plastic. Similarly, the fixture body 502 may further include a lower portion 510 which is also coupled to the central portion 504 and may also be formed of a thermally insulating material, such as plastic. The upper and lower portions 508, 510, insulate the cooled portions of the light fixture 500, such as the central portion 504, from the space surrounding the light fixture 500, which reduces the likelihood of condensation forming on or within the light fixture 500. For example, even where there is a temperature difference between the central portion 504 (being at a lower temperature) and the space surrounding the light fixture 500 (being at a higher temperature), formation of condensation is restricted due to the insulation provided to the central portion 504 by the thermally insulating upper and lower portions 508, 510.

Figure 6:
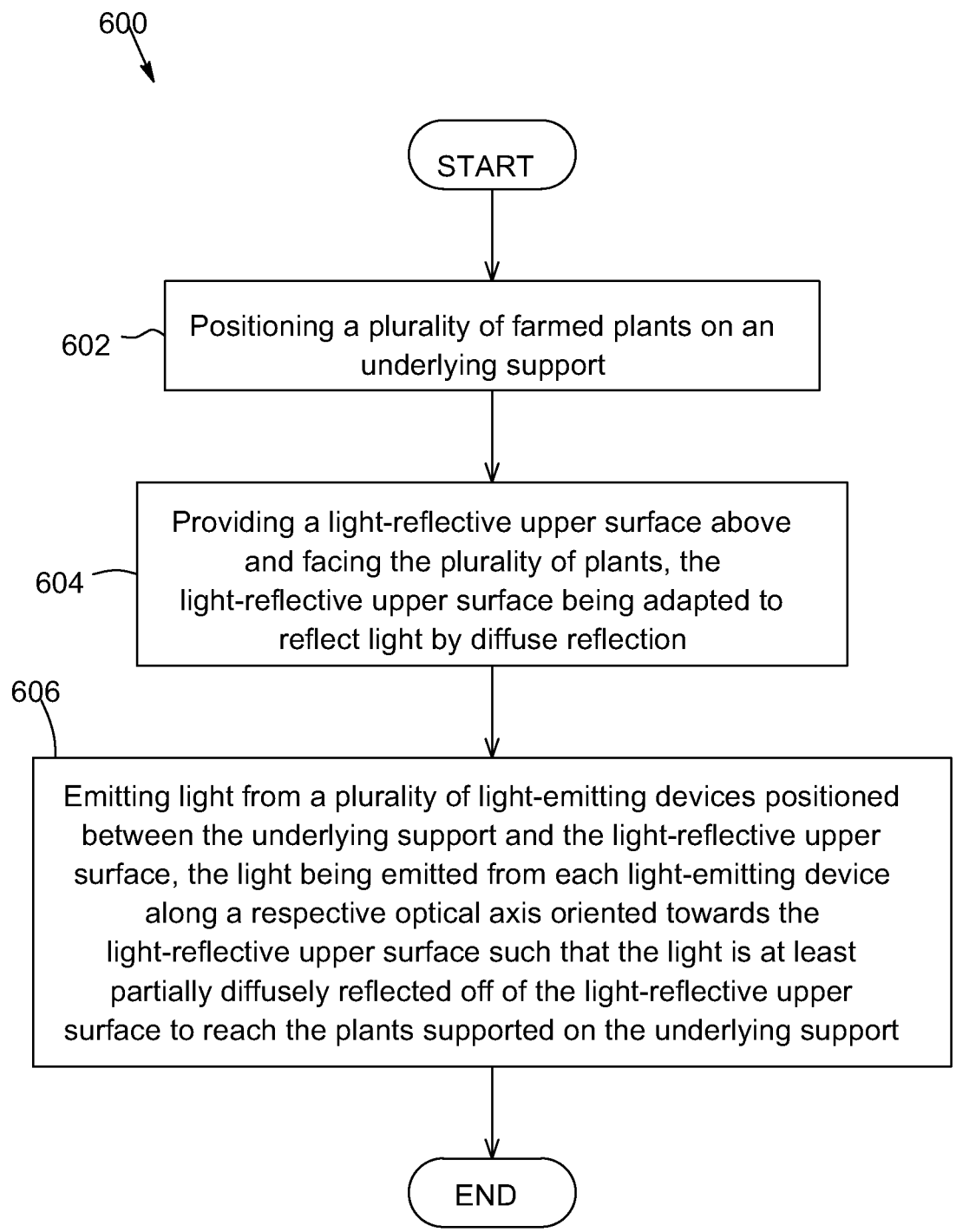
FIG. 6 is a flowchart showing a method for vertical farming, in accordance with one embodiment.

Referring now to FIG. 6, a method 600 for vertical farming will now be described, in accordance with one embodiment.

According to 602, a plurality of plants 250 is positioned within the vertical farming layer structure 200 on the underlying support 208.

According to 604, the light-reflective upper surface 214 is provided above the plants 250. As described above, the light-reflective upper surface 214 is further adapted to reflect light by diffuse reflection, rather than purely specular reflection. As further described above, the light-reflective upper surface 214 may be adapted to diffuse more than 80% of the light directed towards the light-reflective upper surface 214 for light in at least a portion of a range of wavelengths comprised between 400 nm to 1400 nm. More specifically, the light-reflective upper surface 214 may be adapted to diffuse more than 90% of the light directed towards the light-reflective upper surface 214 for light having a wavelength of 650 nm.

As further described above, the light-reflective upper surface 214 may be covered by a reflective material, such as baked powder coat paint, commercial flat ceiling white paint or a commercial highly-diffusive reflective film, which has been selected for its relative high reflection and diffusion properties. In one embodiment, providing the light-reflective upper surface 214 could therefore include applying the reflective material on the lower surface 216 of the roof 206.

According to 606, light is then emitted from the light-emitting devices 212 positioned between the underlying support 208 and the light-reflective upper surface 214. The light is emitted from each light-emitting device 212 along a respective optical axis A oriented towards the light-reflective upper surface 214 such that the light is at least partially diffusely reflected off of the light-reflective upper surface 214 to reach the plants 250.

Figure 7:
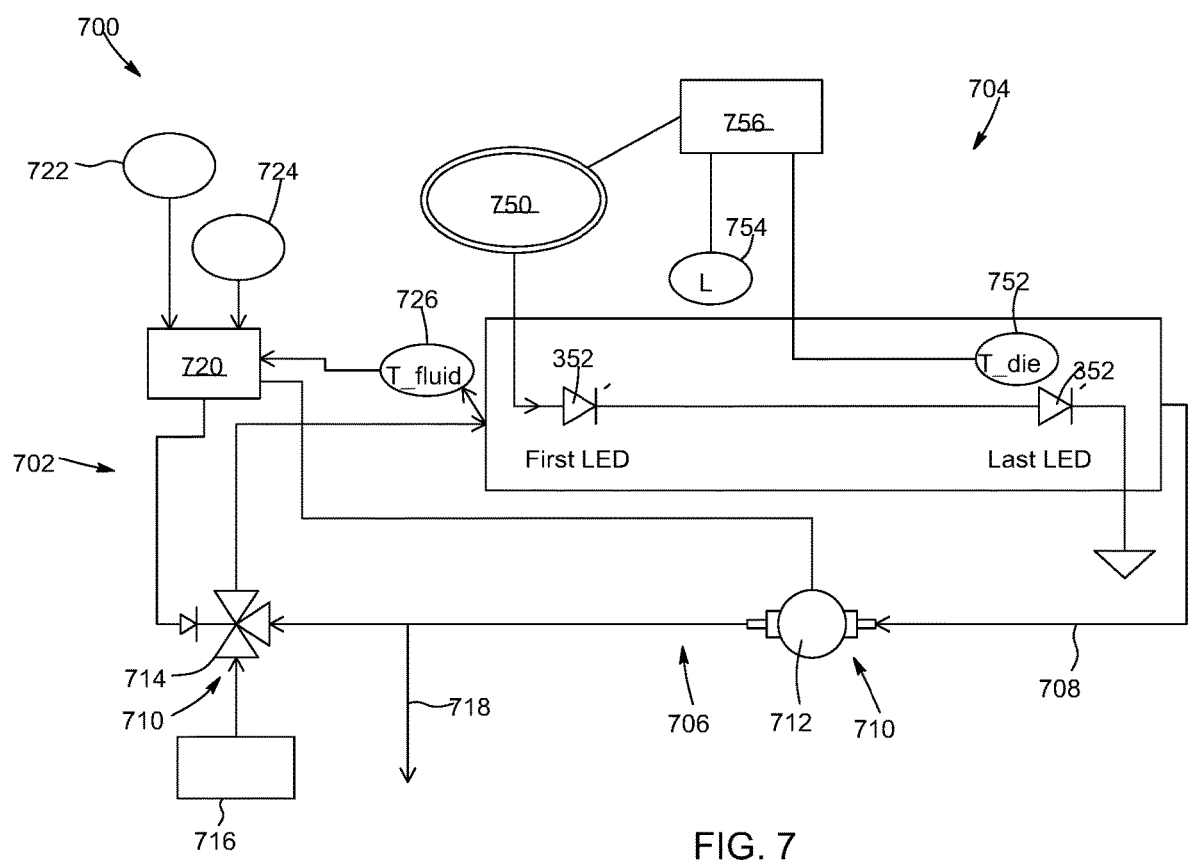
FIG. 7 is a diagram showing a control system for the vertical farming layer structure illustrated in FIG. 2, including a condensation control system and a current control system.

Referring now to FIG. 7, there is shown a control system 700 for the light-emitting devices 212, in accordance with one embodiment.

In the illustrated system, the control system 700 is operatively connected to all of the light-emitting devices 212 and therefore allows all of the light-emitting devices 212 to be controlled using a single control system. Alternatively, each light-emitting device 212 could be controlled by an individual control system which is separate from the control systems controlling the other light-emitting devices 212. In yet another embodiment, the light-emitting devices 212 could include a plurality of groups of light-emitting devices 212, and the control system 700 could be operatively connected to one of the groups of the light-emitting devices 212 while the other groups of the light-emitting devices 212 are operatively connected and controlled by additional control systems separate from the control system 700.

In the illustrated embodiment, the control system 700 includes a condensation control system 702 for controlling the formation of condensation on the light fixture 218 and a current control system 704 for controlling the electrical current provided to the light-emitting devices 212.

It will be understood that although both the condensation control system 702 and the current control system 704 are shown herein as part of the same control system 700, the condensation control system 702 and the current control system 704 may be provided and operated independently.

The condensation control system 702 includes a cooling circuit 706 thermally connected to the light-emitting device(s) 212 to absorb at least a portion of the heat emitted by the light-emitting device 212. The cooling circuit 706 includes the coolant conduit, identified in FIG. 7 using reference numeral 708, passing through the lower channel 320 of the light fixture 218. As shown in FIG. 7, the coolant conduit 708 forms a closed-loop circuit through which coolant is circulated. It will be understood that this circulation of coolant allows the cooling circuit 706 to draw heat from the light fixture 218 to thereby cool the light fixture 218.

The cooling circuit 706 further includes one or more flow regulators 710, such as a valve or a pump, for regulating the flow of coolant through the cooling circuit 706. The regulators 710 are operable to regulate the flow of coolant through the cooling circuit 706, which adjusts the amount of cooling provided by the cooling circuit 706. Regulating the flow may include one or more of start or stopping the flow of coolant, increase or decreasing the flow rate of coolant, operating a heat exchanger, introducing/recycling new coolant.

In the illustrated embodiment, the regulators 710 include a variable speed pump 712 for controlling the flow rate of coolant within the circuit 706. For example, increasing flow rate also increases the rate at which heat is removed from the light fixture 218. Conversely, decreasing the flow rate decreases the rate at which heat is removed from the light fixture 218.

Still in the illustrated embodiment, the regulators 710 further include a valve 714 and, more particularly, a three-way valve, for controlling the flow of new coolant into the cooling circuit 706. Specifically, the valve 714 may be operatively connected to a coolant reservoir 716 containing the new coolant. The valve 714 may further be controlled to allow or prevent new coolant from entering the cooling circuit 706 and the flow rate at which new coolant enters the circuit 706. The cooling circuit 706 may further be operatively connected to a coolant discharge line 718 which allows coolant exiting the light fixture 218, and thus having absorbed heat from the light fixture 218, to exit the cooling circuit 706. It will be understood that introduction of new coolant 340 further increases the rate at which heat is removed from the light fixture 218.

Alternatively, instead of the variable pump 712 and the valve 714, the regulators 710 may include any other combinations of regulators which a skilled person would consider to be suitable, such as a fixed speed pump with a valve, or a variable pump operating by itself.

In the illustrated embodiment, the condensation control system 702 further includes a controller 720 operatively connected to the variable pump 712 and the valve 714 for operating and controlling the variable pump and the valve. More specifically, the controller 720 is configured for sending control signals to the variable pump 712 and the valve 714 to control the amount of cooling provided by the cooling circuit 706, thereby also controlling the temperature of the light fixture 218. More particularly, the controller 720 may control the variable pump 712 and the valve 714 to ensure that the light fixture 218 is kept sufficiently cool (which improves light output from the light-emitting devices 212) while not being too cool such that condensation forms (which may reduce performance and/or damage elements of the light fixture 218).

The controller 720 described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

In the illustrated embodiment, the controller 720 is further configured to receive one or more measurements of at least one environmental condition in proximity of the light fixture 218. For instance, the controller 720 may be operatively connected to one or more sensors. In the illustrated embodiment, the condensation control system 702 includes a relative humidity sensor or hygrometer 722 which is located in proximity of the light fixture 218 and which is operatively connected to the controller 720. The hygrometer 722 measures the relative humidity (RH_env) within the space and provides the measured relative humidity to the controller 720.

Still in the illustrated embodiment, the condensation control system 702 further includes a temperature sensor or thermometer 724 which is located in proximity of the light fixture 218 and which is operatively connected to the controller 720. The thermometer 724 measures the temperature (T_env) within the space and provides the measured temperature to the controller 720.

The controller 720 is further configured to determine a condensation threshold temperature, also referred to as a dew point temperature (T_dew) based on the one or more measurements of the at least one environmental condition. The condensation threshold temperature corresponds to the temperature at which condensation is susceptible to start forming on the light fixture 218. For example, the condensation threshold temperature may be calculated based on the measured relative humidity (RH_env) and the measured temperature (T_env). The controller 720 may implement a mathematical formula to determine the condensation threshold temperature. Alternatively, the condensation threshold temperatures for various combinations of the relative humidity and the temperature can be prestored in a data storage device, such as a look-up table, operatively connected to the controller 720.

In the illustrated embodiment, the controller 720 may further monitor the temperature of the coolant (T_fluid) within the cooling circuit 706 using a coolant temperature sensor 726 operatively connected to the controller 720 and in thermal contact with the coolant. It will be appreciated that the temperature of the coolant (T_fluid) is generally representative of the temperature of the light fixture 218. Based on the monitored temperature, the controller 720 controls the variable pump 712 and the valve 714 to maintain the temperature of the coolant within the cooling circuit 706 above the determined condensation threshold temperature.

It will be appreciated that although the temperature of the coolant may be representative of the temperature of the light fixture 218, the temperature of the coolant may in fact be different, or offset, from the effective temperature of the light fixture 218.

In this case, a light fixture threshold temperature may initially be calculated based on the at least one environmental conditions. This light fixture threshold temperature is then adjusted by an offset corresponding to the difference between the temperature of the coolant and the effective temperature of the light fixture to obtain the condensation threshold temperature. This offset may be predetermined based on, for example, measurements made on the light fixture during a design/configuration phase, and may vary depending on factors such as the presence of one or more of spacing between the coolant conduit 708 and a surface of the light fixture 218, insulating materials of the light fixture 218, and an amount of heat generated by the light-emitting devices 212 of the light fixture 218.

When the condensation threshold temperature has been properly adjusted based on the light fixture condensation threshold temperature, maintaining the condensation threshold temperature ensures that condensation does not form at the light fixture 218.

Figure 8:
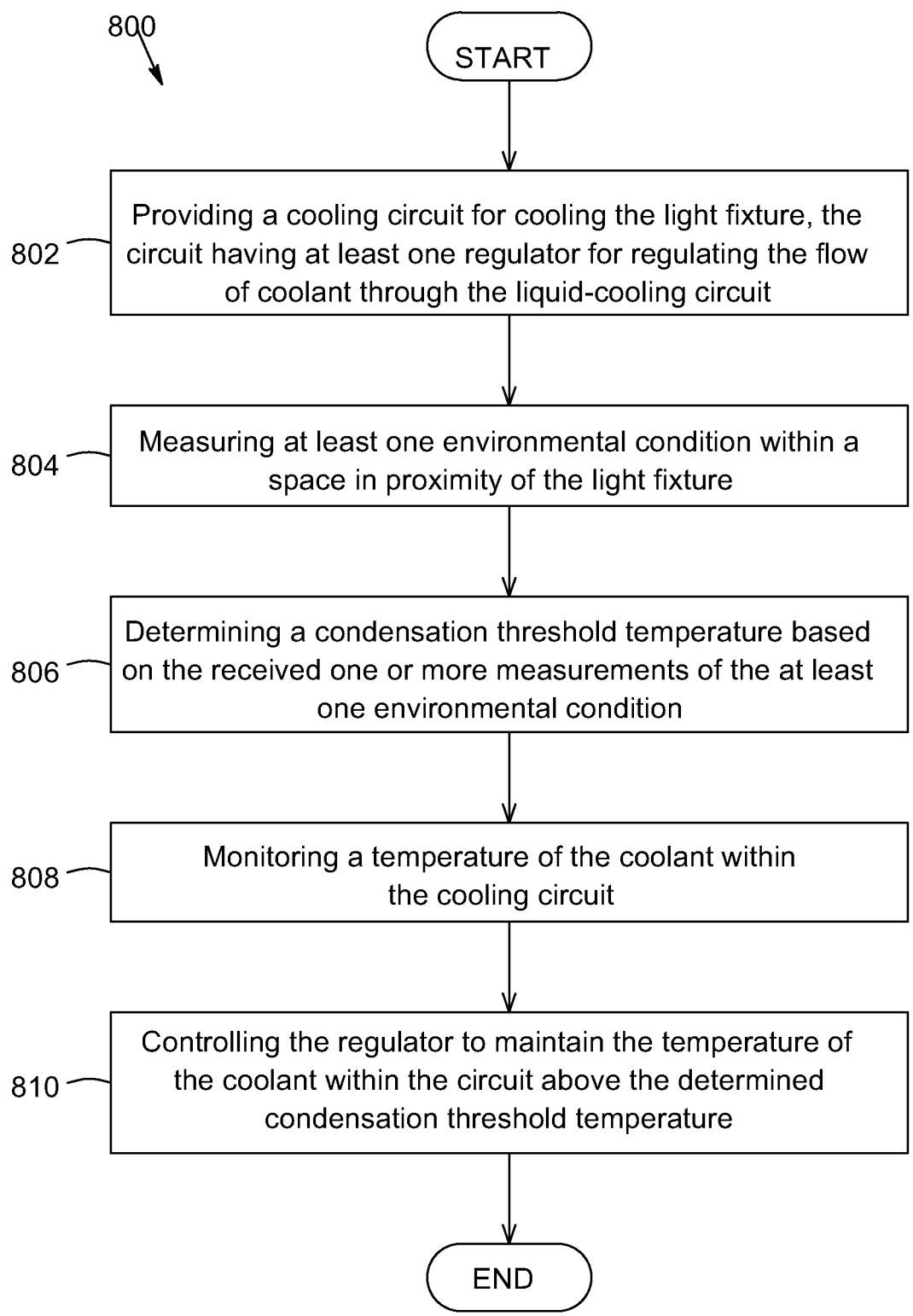
FIG. 8 is a flowchart showing a method for controlling condensation of a light fixture, in accordance with one embodiment.

Referring now to FIG. 8, a method 800 for controlling condensation on a light fixture will now be described, in accordance with one embodiment.

According to 802, the cooling circuit, as described above, is first provided.

According to 804, at least one environmental condition is measured within a space in proximity of the light fixture. In one embodiment, the at least one environmental condition includes the relative humidity (RH_env) and the temperature (T_env) within the space.

According to 806, the condensation threshold temperature is then determined, as described above. In one embodiment, to determine the condensation threshold temperature, a light fixture threshold temperature is first determined, and then adjusted by a determined offset to obtain the condensation threshold temperature, as also described above.

According to 808, the temperature of the coolant (T_fluid) may then be monitored within the cooling circuit.

According to 810, the flow regulator may be controlled/adjusted to maintain the coolant within the circuit above the predetermined condensation threshold temperature. In one embodiment, controlling the flow regulator may include controlling the variable pump and/or the valve by adjusting their speed or their opening respectively.

Figure 9:
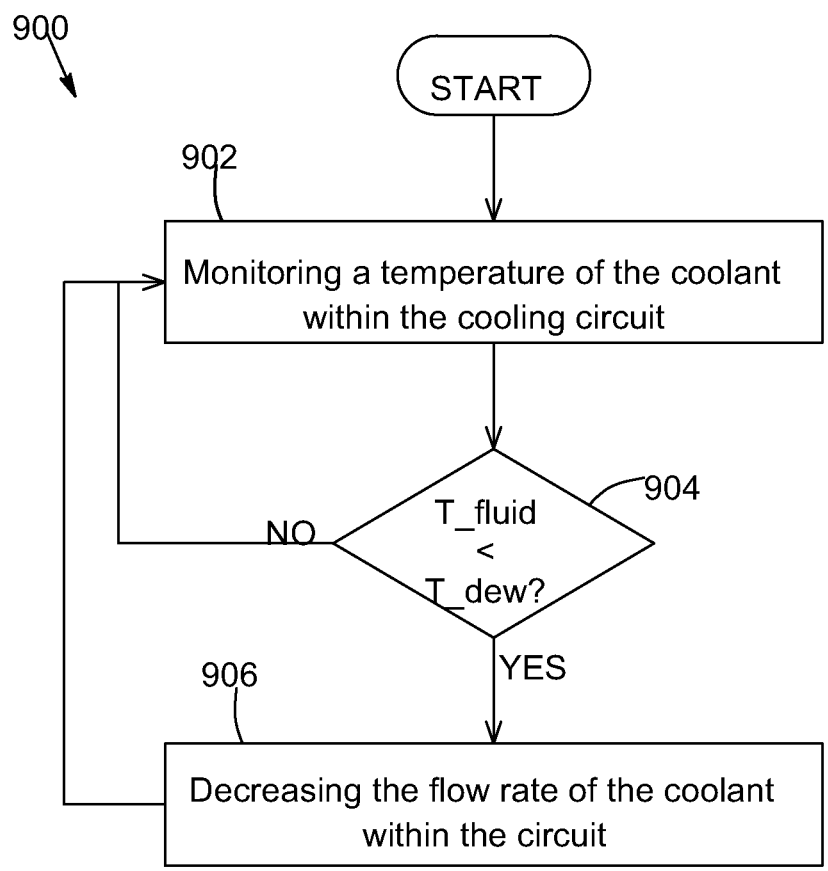
FIG. 9 is a flowchart showing a first subroutine for controlling a regulator of a condensation control system for a light-emitting device, in accordance with one embodiment.

Turning to FIG. 9, there is shown a first subroutine 900 for controlling the regulator, in accordance with one embodiment.

According to 902, the temperature of the coolant (T_fluid) is monitored within the cooling circuit, and the monitored temperature is compared to the predetermined condensation threshold temperature (T_dew) at 904.

If the monitored temperature of the coolant is lower than the predetermined condensation threshold temperature (T_dew), the flow rate of the coolant within the cooling circuit 706 is decreased, in accordance with 906. More specifically, the controller 720 sends a command to the variable pump 712 to decrease the flow rate of the coolant. As explained above, the flow rate can be reduced by actuating the variable pump 712. This will reduce the cooling of the light fixture and thereby prevent or at least limit the formation of condensation on the light fixture 218.

If the monitored temperature of the coolant is higher than the predetermined condensation threshold temperature, then the flow rate of the coolant within the circuit remains unchanged and the temperature of the coolant is monitored again.

In the embodiment illustrated in FIG. 9, the subroutine 900 defines a closed loop, such that the temperature of the coolant is permanently monitored and compared to the predetermined condensation threshold temperature (T_dew).

Figure 10:
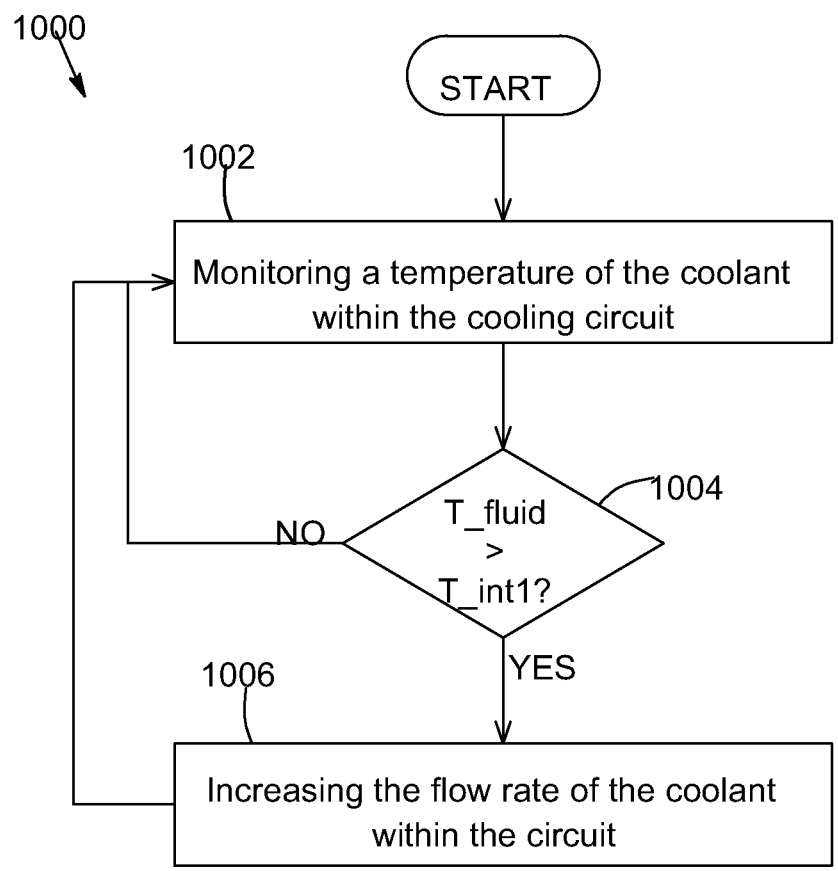
FIG. 10 is a flowchart showing a second subroutine for controlling a regulator of a condensation control system for a light-emitting device, in accordance with one embodiment.

Turning now to FIG. 10, there is shown a second subroutine 1000 for controlling the flow regulator, in accordance with one embodiment.

According to this second subroutine 1000, there is defined a first predetermined intermediate threshold temperature (T_int1) which is selected such that, if the temperature of the coolant rises above the first predetermined intermediate threshold temperature, an indication is provided that despite the cooling provided by the cooling circuit 706, the temperature of the coolant and therefore of the light fixture 218 is rising and/or relatively high and therefore that the cooling circuit 706, in its current operating state, may not be sufficiently cooling the light fixture 218. In this case, the operating state of the cooling circuit 706 will be adjusted to increase the cooling provided to the light fixture 218. More specifically, the flow rate of the coolant within the cooling circuit 706 may be increased to increase the cooling of the light fixture 218.

Accordingly, the temperature of the coolant (T_fluid) is first monitored within the cooling circuit 706, in accordance with 1002, and the monitored temperature is compared to a first predetermined intermediate threshold temperature (T_int1) at 1004.

If the temperature of the coolant (T_fluid) is greater than the first intermediate threshold temperature (T_int1), then the flow rate of the coolant is increased to increase the cooling of the light fixture 218. As explained above, the flow rate can be increased by actuating the variable pump 712. Alternatively, instead of increasing the flow rate of the coolant, the coolant could be further cooled in order to increase the coolant's capacity to draw heat from the light fixture 218. More specifically, the cooling circuit 706 may further include a coolant temperature control system which may comprise a heat exchanger, a compressor and/or other components which can be used to lower the temperature of the coolant. The coolant temperature control system could further include a coolant temperature controller operatively connected to one or more components of the coolant temperature control system to adjust an initial temperature of the coolant which is directed towards the light fixture 218 to be circulated through the light fixture 218. By lowering the temperature of the coolant provided to the light fixture 218, the cooling of the light fixture 218 will thereby be increased.

In the embodiment illustrated in FIG. 10, the subroutine 1000 defines a closed loop, such that the temperature of the coolant is permanently monitored and compared to the first intermediate threshold temperature (T_int1). The flow rate of the coolant will therefore be further increased until the temperature of the coolant (T_fluid) falls back below the first intermediate threshold temperature (T_int1).

In one embodiment, the flow regulator may be controlled using both the second subroutine 1000 and the first subroutine 900. In this case, the temperature of the coolant may therefore be generally maintained within a range defined by a lower limit corresponding to the predetermined condensation threshold temperature (T_dew) and an upper limit corresponding to the first intermediate threshold temperature (T_int1).

Figure 11:
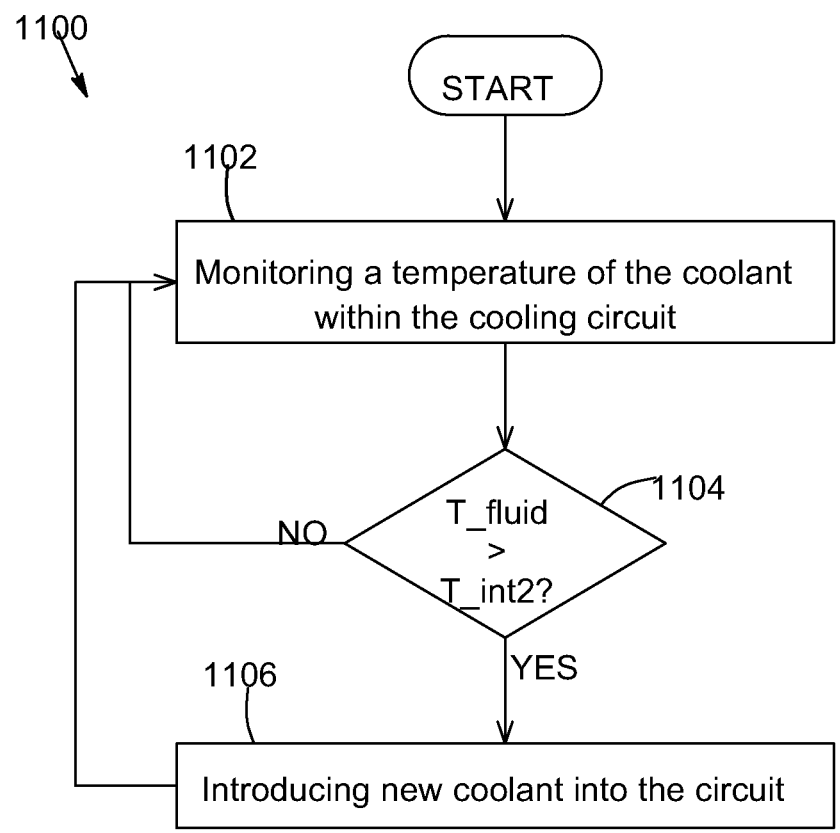
FIG. 11 is a flowchart showing a third subroutine for controlling a regulator of a condensation control system for a light-emitting device, in accordance with one embodiment.

Turning now to FIG. 11, there is shown a third subroutine 1100 for controlling the flow regulator, in accordance with one embodiment.

According to this third subroutine 1000, there is defined a second predetermined intermediate threshold temperature (T_int2) which is selected such that, if the temperature of the coolant rises above the second predetermined intermediate threshold temperature, an indication is provided that despite the cooling provided by the cooling circuit 706, the temperature of the coolant and therefore of the light fixture 218 is rising and/or relatively high and therefore that the cooling circuit 706, in its current operating state, may not be sufficiently cooling the light fixture 218. In this case, the operating state of the cooling circuit 706 will be adjusted to increase the cooling provided to the light fixture 218. More specifically, new coolant is introduced in the cooling circuit 706.

In one embodiment, the flow regulator may be controlled using both the third subroutine 1100 and the second subroutine 1000. In this case, the second predetermined intermediate threshold temperature (T_int2) would be higher than the first predetermined intermediate threshold temperature (T_int1). If the temperature of the coolant rises over the first intermediate threshold temperature (T_int1), the flow rate of the coolant within the cooling circuit 706 would therefore be increased, as described above. If despite the increase of flow rate of the coolant, the temperature of the coolant still rises such that the temperature of the coolant rises above the second predetermined intermediate threshold temperature (T_int2), then new coolant would be introduced in the cooling circuit 706 to further increase the cooling of the lighting fixture 218 as an additional mechanism to ensure that the light fixture 218 remains suitably cooled during operation.

According to 1102, the temperature of the coolant (T_fluid) is monitored within the cooling circuit, and the monitored temperature is compared to a second predetermined intermediate threshold temperature (T_int2) at 1104.

If the temperature of the coolant (T_fluid) is greater than the second intermediate temperature threshold (T_int2), then the control system 700 introduces new coolant into the cooling circuit 706 from the coolant reservoir 716 to further increase the cooling of the light fixture 218. As explained above, new coolant can be introduced in the cooling circuit 706 by actuating the valve 714.

In the embodiment illustrated in FIG. 11, the subroutine 1100 defines a closed loop, such that the temperature of the coolant is permanently monitored and compared to the second intermediate temperature threshold (T_int2). New coolant will therefore be introduced in the cooling circuit 706 until the temperature of the coolant (T_fluid) falls back below the second intermediate temperature threshold (T_int2).

It will be appreciated that the subroutines 900, 1000, 1100 More specifically, the method 800 for controlling condensation on a light fixture illustrated in FIG. 8 could include a combination of two or three of the subroutines 900, 1000, 1100 described above.

Referring back to FIG. 7, the current control system 704 is operable to control the amount of current being provided to the light-emitting device 212.

In the illustrated embodiment, the current control system 704 includes a variable current source 750 configured for providing a variable level of current to one or more LEDs 352. The current control system 704 further includes a temperature sensor or thermometer 752 for monitoring temperature of the LEDs 352. In one embodiment, the LEDs 352 are connected together in series, as explained above. In this configuration, it was observed that, in some circumstances, the LED 352 located furthest from the current source 750 exhibited the highest temperature and was most susceptible to failure. In this embodiment, temperature is therefore measured at the LED 352 that is positioned furthest from the current source 750 along the series connection.

It will be appreciated that LEDs are typically made of a plurality of components, including an anode, a cathode and a semiconductor chip or die operatively connected to the die. Light is produced by the die by providing electric current to the die via the anode and cathode. The LED may further include a lend or case encasing the die and forming the exterior of the LED. In one embodiment, the thermometer 752 is configured for measuring the temperature directly at the die of the LED (T_die).

The current control system 704 further includes a light sensor 754 configured for monitoring light intensity emitted from the light emitting device 212, such as the LEDs 352. For example, the light sensor 754 can be positioned at a height corresponding to approximately the tallest point of the plants 250 received in the vertical farming layer structure 200.

The current control system 704 also includes a controller 756 operatively connected to the thermometer 752 and to the light sensor 754 for receiving the monitored temperature at the die of the light-emitting diode 180 (T_die) and the monitored light intensity (L). The controller 756 is further operatively connected to the variable current source 750 and is configured for sending control signals to adjust the instantaneous level of current fed by the variable current source 750 to the LEDs 352. In an embodiment in which the control system 700 further includes the condensation control system 702, the controller 756 may include the controller 720 of the condensation control system 702. Alternatively, the controller 756 may be distinct from the controller 720 of the condensation control system 702. In yet another embodiment, the controller 756 may be imbedded in the variable current source 750.

The controller 756 of the current control system 704 described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller 756. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller 756 is further configured to control the instantaneous level of current fed to the LEDs so that a sufficient current is provided to the LEDs and that the intensity of the light emitted from the LEDs 352 reaches a predetermined target light intensity. For example, the target light intensity may be a level that promotes growth of the plants 250.

At the same time, the controller 756 is configured to control the instantaneous level of current fed to the LEDs 352 so that the temperature at the LEDs 352 does not exceed a predetermined temperature threshold. It will be appreciated that as current to the LEDs 352 is increased, temperature of the LEDs 352 is also increased. The predetermined temperature threshold corresponds to a temperature at which the LEDs 352 become susceptible to failure.

In one embodiment, the controller 756 may further be configured to maintain the instantaneous level of current below a predetermined critical current level for the LEDs 352 according to the design of the LEDs 352.

Furthermore, the controller 756 is configured to maintain an instantaneous level of current fed to the LEDs 352 if the monitored light intensity has reached the target light intensity. This condition indicates that the current provided is sufficient to cause the LEDs 352 to emit light at the target light intensity. Further increasing the current level may cause undesirable inefficiencies or increase the likelihood of LED failure.

Figure 12:
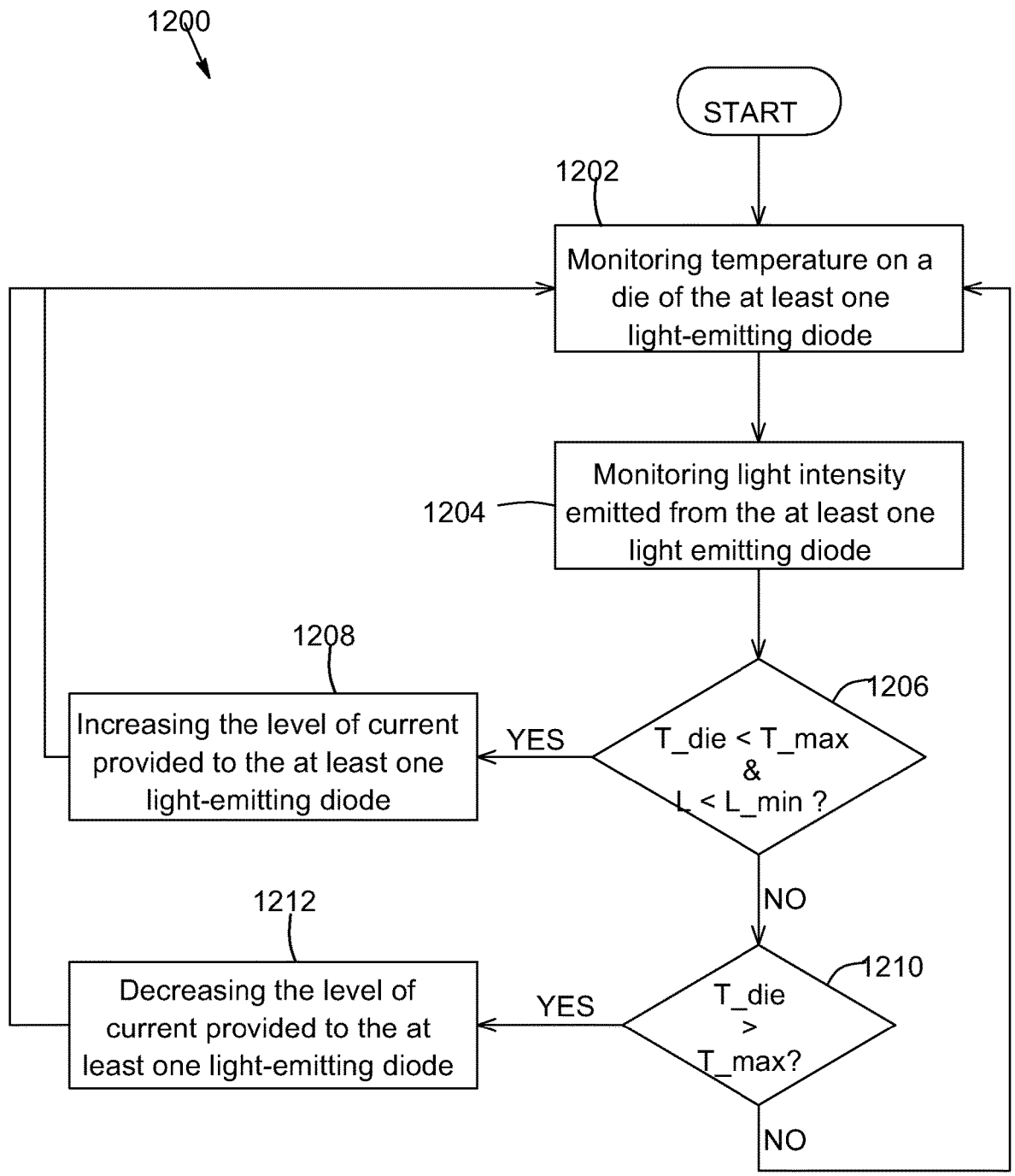
FIG. 12 is a flowchart showing a method for controlling electric current fed to at least one light-emitting diode, in accordance with one embodiment.

Now turning to FIG. 12, a method 1200 for controlling electric current fed to at least one light-emitting diode will now be described, in accordance with one embodiment. The method 1300 may be performed using the current control system 704 described above.

According to 1202, temperature of a LED 352 is monitored. In one embodiment, the temperature of the LED 352 is monitored by monitoring a temperature on the die of the LED 352, as described above. In one embodiment, the LEDs 352 are further connected together in series and the temperature is measured at the LED 352 that is positioned furthest from the current source 750 along the series connection, as also explained above.

According to 1204, light intensity emitted from the LEDs 352 is also monitored.

According to 1206, the monitored temperature of the die (T_die) is compared to the predetermined temperature threshold (T_max). Still according to 1206, the monitored light intensity (L) is also compared to the predetermined target light intensity (L_min).

If the monitored die temperature (T_die) is below the predetermined temperature threshold (T_max) and if concurrently the monitored light intensity (L) is below the predetermined target light intensity (L_min), then, according to 1208, the level of current provided to the LEDs 352 is increased by the variable current source 750.

Otherwise, according to 1210, the monitored die temperature (T_die) is compared to the predetermined temperature threshold (T_max). If the monitored die temperature (T_die) is greater than the predetermined temperature threshold (T_max), then, according to 1212, the level of current provided to the LEDs 352 is decreased by the variable current source 750.

In the illustrated embodiment, the method 1200 defines a closed loop such that the die temperature and the light intensity will permanently be monitored to try and maintain the system at the predetermined target light intensity (L_min) by increasing the level of current provided to the LEDs 342 until the target light intensity is reached or the monitored die temperature exceeds the predetermined temperature threshold, indicating that the LEDs 342 are overheated. In this case, the level of current provided to the LEDs 342 will decrease until the monitored die temperature falls below the predetermined temperature threshold. The level of current provided to the LEDs 342 will then increase again to try and attain again the predetermined target light intensity (L_min).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A vertical farming layer structure provided as a single structure, the vertical farming layer structure comprising:
   an underlying support for supporting a plurality of farmed plants;
   a light-reflective upper surface positioned above and vertically aligned with the underlying support, the light-reflective upper surface being adapted to reflect light by diffuse reflection; and
   a plurality of light emitting devices positioned between the underlying support and the light-reflective upper surface, each light-emitting device being positioned to emit light along a respective optical axis oriented towards the light-reflective upper surface such that light emitted from the light-emitting device is at least partially diffusely reflected off of the light-reflective upper surface to reach the plants supported on the underlying support.

2. The vertical farming layer structure as claimed in claim 1, wherein the light-reflective upper surface is adapted to diffuse more than 80% of the light directed towards the light-reflective upper surface for light in at least a portion of a range of wavelengths comprised between 400 nm and 1400 nm.

3. The vertical farming layer structure as claimed in claim 2, wherein the light-reflective upper surface is adapted to diffuse more than 96% of the light directed towards the light-reflective upper surface for light having a wavelength comprised between 400 nm and 780 nm.

4. The vertical farming layer structure as claimed in claim 1, wherein the plurality of light-emitting devices includes a first plurality of light-emitting devices configured for emitting light at a first wavelength and a second plurality of light-emitting devices configured for emitting light at a second wavelength different from the first wavelength.

5. The vertical farming layer structure as claimed in claim 4, wherein the first and second wavelengths are comprised between 400 nm and 1400 nm.

6. The vertical farming layer structure as claimed in claim 4, wherein the first plurality of light-emitting devices is further configured to emit light at a first intensity and the second plurality of light-emitting devices is configured to emit light at a second intensity different from the first intensity.

7. The vertical farming layer structure as claimed in claim 1, wherein the optical axis of each light-emitting device is non-vertical.

8. The vertical farming layer structure as claimed in claim 7, wherein the light-reflective upper surface is planar and further wherein the optical axis of each light-emitting device is angled relative to the light-reflective upper surface.

9. The vertical farming layer structure as claimed in claim 8, wherein the optical axis of each light-emitting device is angled at an angle of between 3 degrees and 9 degrees above a horizontal plane.

10. The vertical farming layer structure as claimed in claim 1, further comprising a plurality of light fixtures, each light fixture supporting a respective pair of the plurality of light-emitting devices.

11. The vertical farming layer structure as claimed in claim 10, wherein for each light fixture, a first of the pair of the light-emitting devices is retained on a first lateral side of the fixture and a second of the pair of the light-emitting devices is retained on a second lateral side of the fixture opposite the first lateral side.

12. The vertical farming layer structure as claimed in claim 11, wherein the light fixtures are elongated and are disposed parallel to each other in a common horizontal plane, the light fixtures being further spaced apart from each other in a transversal direction by a distance of 24 inches.

13. The vertical farming layer structure as claimed in claim 1, wherein the light-emitting devices are light-emitting diodes.

14. The vertical farming layer structure as claimed in claim 13, wherein the light-emitting diodes are secured to a substrate panel and are disposed in at least one row on the substrate panel.

15. The vertical farming layer structure as claimed in claim 14, wherein the at least one row includes a first row and a second row extending parallel to the second row.

16. A vertical farming layer system comprising a plurality of farming layer structures as claimed in claim 1, the vertical farming layer structures being arranged in a stacked arrangement.

17. A method for vertical farming, the method comprising:
   providing a vertical farming layer structure as a single structure, the vertical farming layer structure comprising an underlying support, a light-reflective upper surface, and a plurality of light emitting devices;
   positioning a plurality of farmed plants on the underlying support;

providing the light-reflective upper surface above and vertically aligned with the plurality of plants, the light-reflective upper surface being adapted to reflect light by diffuse reflection;

emitting light from the plurality of light-emitting devices positioned between the underlying support and the light-reflective upper surface, the light being emitted from each light-emitting device along a respective optical axis oriented towards the light-reflective upper surface such that the light is at least partially diffusely reflected off of the light-reflective upper surface to reach the plants supported on the underlying support.

18. The method as claimed in claim 17, wherein the light reflective surface is adapted to diffuse more than 80% of the light directed towards the light-reflective upper surface for light in at least a portion of a range of wavelengths comprised between 400 nm and 1400 nm.

19. The method as claimed in claim 17, wherein the optical axis of each light-emitting device is non-vertical.

20. The method as claimed in claim 19, wherein the light-reflective upper surface is planar and further wherein the optical axis of each light-emitting device is angled relative to the light-reflective upper surface.

* * * * *